(12) United States Patent
Suzuki et al.

(10) Patent No.: US 7,136,356 B2
(45) Date of Patent: Nov. 14, 2006

(54) PACKET DATA TRANSFER METHOD AND PACKET DATA TRANSFER APPARATUS

(75) Inventors: Toshiaki Suzuki, Cambridge (GB); Itaru Mimura, Sayama (JP); Tatsuya Kameyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 958 days.

(21) Appl. No.: 09/809,215

(22) Filed: Mar. 16, 2001

(65) Prior Publication Data

US 2001/0048662 A1 Dec. 6, 2001

(30) Foreign Application Priority Data

Jun. 1, 2000 (JP) ............................. 2000-165007

(51) Int. Cl.
*G01R 31/08* (2006.01)

(52) U.S. Cl. ....................................... 370/235; 370/412

(58) Field of Classification Search ................ 370/235, 370/260, 230, 408, 412, 338, 390; 709/224, 709/245; 714/807
See application file for complete search history.

(56) References Cited

U.S. PATENT DOCUMENTS

| 5,517,494 | A | * | 5/1996 | Green ........................ 370/408 |
| 5,742,606 | A | | 4/1998 | Iliadis et al. ................ 370/413 |
| 5,764,641 | A | * | 6/1998 | Lin ............................ 370/412 |
| 5,892,924 | A | * | 4/1999 | Lyon et al. ................. 709/245 |
| 5,898,687 | A | * | 4/1999 | Harriman et al. .......... 370/390 |
| 6,052,734 | A | * | 4/2000 | Ito et al. .................... 709/235 |
| 6,279,140 | B1 | * | 8/2001 | Slane ......................... 714/807 |
| 6,324,169 | B1 | * | 11/2001 | Roy ........................... 370/260 |
| 6,452,915 | B1 | * | 9/2002 | Jorgensen ................... 370/338 |
| 6,590,902 | B1 | * | 7/2003 | Suzuki et al. .............. 370/465 |
| 6,717,912 | B1 | * | 4/2004 | Lemyre et al. ............. 370/230 |
| 6,721,273 | B1 | * | 4/2004 | Lyon ........................ 370/235 |
| 6,751,663 | B1 | * | 6/2004 | Farrell et al. .............. 709/224 |
| 6,788,646 | B1 | * | 9/2004 | Fodor et al. ................ 370/230 |
| 6,977,928 | B1 | * | 12/2005 | Bass et al. .................. 370/390 |

FOREIGN PATENT DOCUMENTS

| JP | 3-135248 | 10/1989 |
| JP | 05-235985 | 9/1993 |
| JP | 06-339137 | 12/1994 |
| JP | 07-135512 | 5/1995 |
| JP | 10-247944 | 3/1997 |
| JP | 09-205461 | 8/1997 |
| JP | 2000-078573 | 9/1998 |

(Continued)

OTHER PUBLICATIONS

Douglas E. Comer, Internetworking with TCP/IP Principles, Protocols, and Architectures, Fourth Edition, Prentice Hall, 1995, pp. 542-551.*

Douglas E. Comer, Internetworking with TCP/IP Principles, Protocols, and Architectures, Fourth Edition, Prentice Hall, 1995, pp. 542-551.*

(Continued)

*Primary Examiner*—Doris H. To
*Assistant Examiner*—Robert W. Wilson
(74) *Attorney, Agent, or Firm*—Reed Smith LLP; Stanley P. Fisher, Esq.; Juan Carlos A. Marquez, Esq.

(57) ABSTRACT

Flow identifier data of layered audiovisual data to be processed on the occurrence of congestion, as well as control code data for initiating or terminating the discard of packet data, is retained. When congestion occurs, selective transmission units perform discard initiation or termination on data having the flow identifier data indicating the layered audiovisual data retained, based on the control code data for performing the discard-initiating or -terminating operation of the packet data.

18 Claims, 15 Drawing Sheets

FOREIGN PATENT DOCUMENTS

JP          11-068784          3/1999

OTHER PUBLICATIONS

Douglas E. Comer, Internetworking with TCP/IP Principles, Protocols, and Architectures, Prencile Hall, 1995, Fourth Edition, vol. 1, pp. 97-100.*

Yoshio Sugizaki and Koichi Asatani, "A Study on a New Selective Cell Discard Scheme with Two Thresholds Control," IEICE Technical Report, vol. 99, No. 621, pp. 55-61.

Shigeyuki Sakazawa, Yasuhiro Takishima and Masahiro Wada, "A Coding and Transmission Control Scheme for Video Multicast", The Journal of the Institute of Image Information and Television Engineers, vol. 52, No. 6 (1998) pp. 863-870.

Chiba, Takeshi et al., "Improvement of Early Packet Discard Based on Queue Length", The Institute of Electronics, Information and Communication Engineers, Technical Reportof IEICE, (Feb. 2000), pp. 17-22.

Office Action from the Japanese Patent Office dated Oct. 11, 2005 (in Japanese).

* cited by examiner

FIG. 4

| DATA | DS VALUE (8Bit) | | |
|---|---|---|---|
| | FLOW IDENTIFIER (4Bit) | CONTROL CODE (4Bit) | |
| | | TOP | INTERMITTENT |
| I-FRAME LOWER SPATIAL FREQUENCY COMPONENT | 0x6 | 0xD | 0xC |
| I-FRAME HIGHER SPATIAL FREQUENCY COMPONENT | 0x5 | 0xD | 0xC |
| P-FRAME LOWER SPATIAL FREQUENCY COMPONENT | 0x4 | 0xD | 0xC |
| P-FRAME HIGHER SPATIAL FREQUENCY COMPONENT | 0x3 | 0xD | 0xC |
| B-FRAME LOWER SPATIAL FREQUENCY COMPONENT | 0x2 | 0xD | 0xC |
| B-FRAME HIGHER SPATIAL FREQUENCY COMPONENT | 0x1 | 0xD | 0xC |

FIG. 5

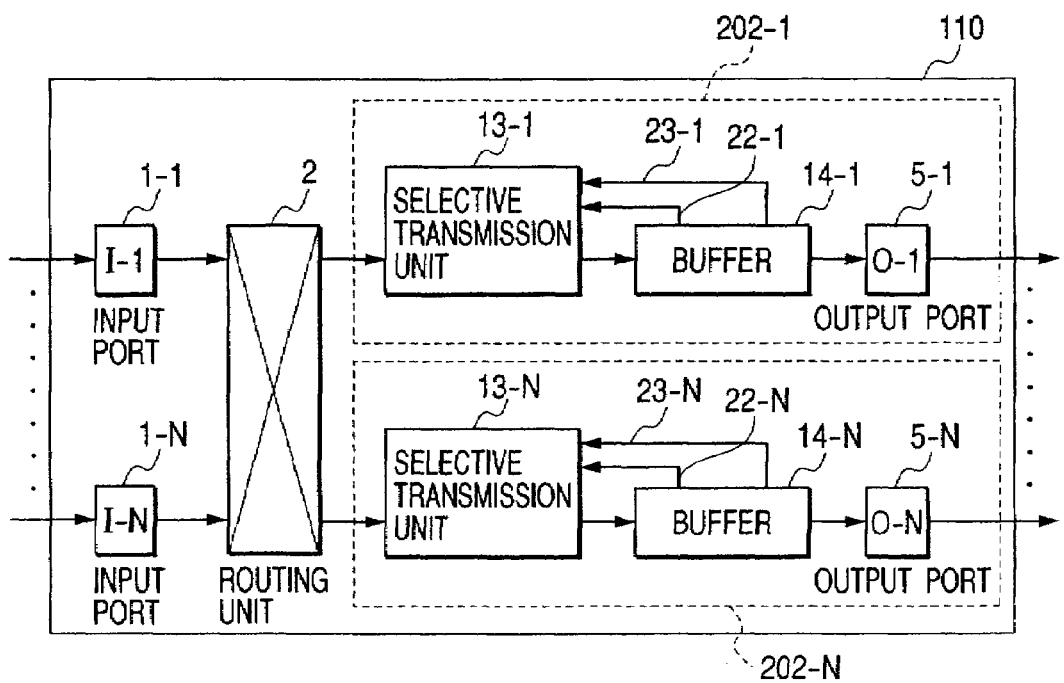

FIG. 17

| DATA | LABEL (20Bit) | | | |
|---|---|---|---|---|
| | CONVERSION PAD (12Bit) | DS VALUE (8Bit) | | |
| | | FLOW IDENTIFIER (4Bit) | CONTROL CODE (4Bit) | |
| | | | TOP | INTERMITTENT |
| I-FRAME LOWER SPATIAL FREQUENCY COMPONENT | 0xFFF | 0x6 | 0xD | 0xC |
| I-FRAME HIGHER SPATIAL FREQUENCY COMPONENT | 0xFFF | 0x5 | 0xD | 0xC |
| P-FRAME LOWER SPATIAL FREQUENCY COMPONENT | 0xFFF | 0x4 | 0xD | 0xC |
| P-FRAME HIGHER SPATIAL FREQUENCY COMPONENT | 0xFFF | 0x3 | 0xD | 0xC |
| B-FRAME LOWER SPATIAL FREQUENCY COMPONENT | 0xFFF | 0x2 | 0xD | 0xC |
| B-FRAME HIGHER SPATIAL FREQUENCY COMPONENT | 0xFFF | 0x1 | 0xD | 0xC |

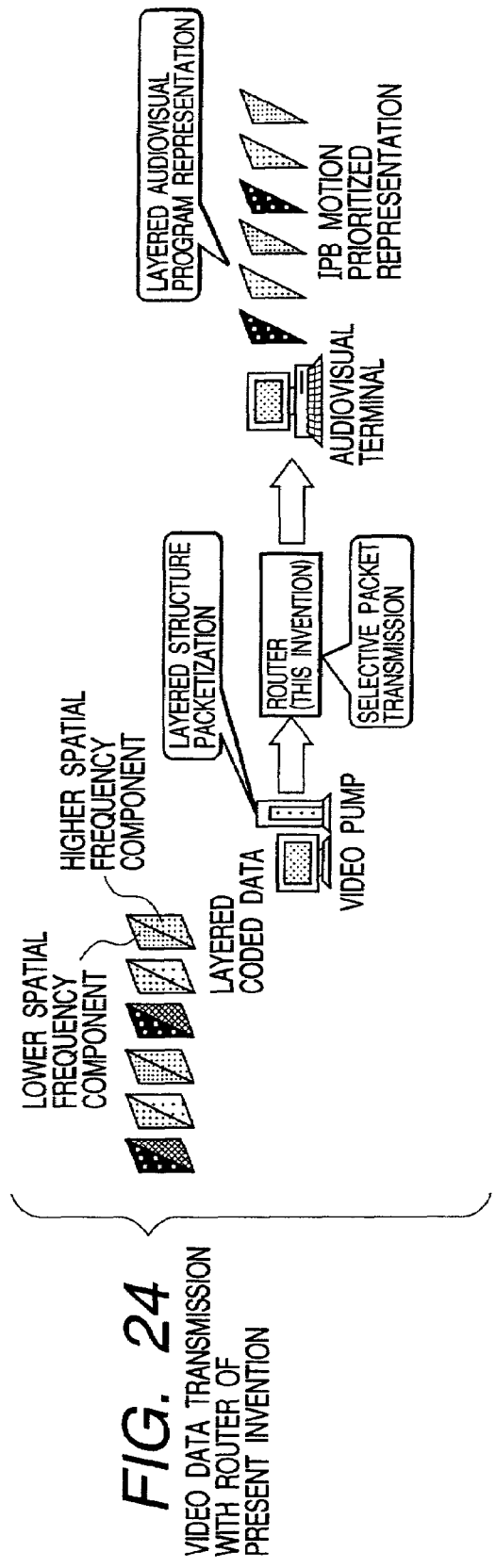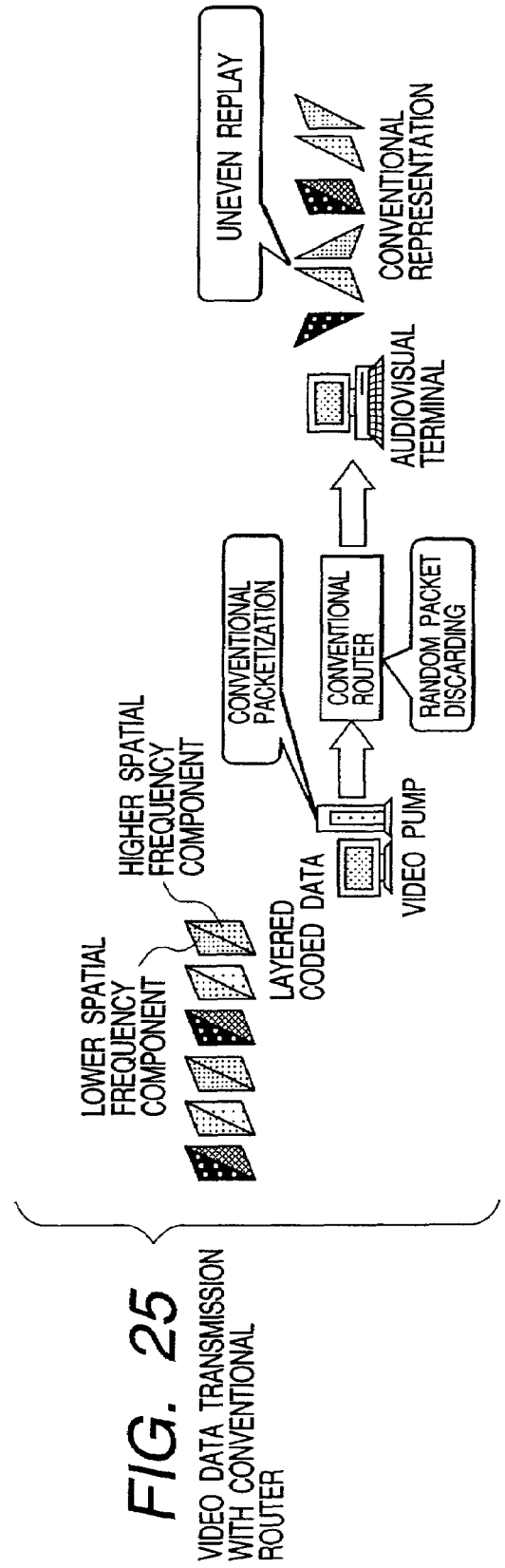

PACKET DATA TRANSFER METHOD AND PACKET DATA TRANSFER APPARATUS

FIELD OF THE INVENTION

The invention relates to distribution, transfer, reception, and reproduction of a program consisting of image and sound data, and more particularly to a transmitting and receiving system for a program consisting of a plurality of streams.

DESCRIPTION OF THE RELATED ART

Among data transmissions on ATM (Asynchronous Transfer Mode) networks is a UBR (Unspecified Bit Rate) service of best-efforts type. For a transmission control scheme that improves the throughput in this UBR transmission, there is known an EPD (Early Packet Discard) control scheme, described in "A Study on A New Selective Cell Discard Scheme with Two Thresholds Control" (IEICE Technical Report, Vol. 99, No. 621, pp. 55–60 (2000.02)). The UBR service is a best-efforts transmission service on an ATM network, and therefore congestion in the transmission network produces discard in ATM cells. When the discard by ATM cell occurs, the entire, yet-to-be partitioned packet data including the discarded cell becomes invalid. Nevertheless, those ATM cells having become invalid continue being transmitted after the cell discard, wasting the transmission channel bandwidth. For this reason, the EPD control scheme provides discard in steps of packet data rather than in cells upon the occurrence of congestion.

Meanwhile, "A Coding and Transmission Control Scheme for Video Multicast" (THE JOURNAL OF THE INSTITUTE OF IMAGE INFORMATION AND TELEVISION ENGINEERS, Vol. 52, No. 6, pp. 863–70 (1998.6)) is known as an image data transmission scheme on IP (Internet Protocol) networks. This scheme describes a control scheme for transmitting layered coded audiovisual data from an image server to audiovisual terminals by using a plurality of channels (multicast address). In this scheme, video data is layered into a total of six types of coded data: namely, I-, P-, and B-frame data as defined in the international-standard MPEG (Moving Picture Experts Group) coding schemes, along with spatial frequency components, or a lower spatial frequency component and a higher spatial frequency component, of each of the frames. These coded data are distributed from the server to the audiovisual terminals by using the plurality of channels. Of the I-, P-, and B-frame data defined in the MPEG coding schemes, P-frame data requires I-frame data for reproduction. Besides, B-frame data requires I- and P-frame data for reproduction. This means that I, P, and B frames decrease in importance in this order. As for the spatial frequency components in each frame, there is such a relation in importance that a lower spatial frequency component which represents fundamental outlines of an image is more important than a higher spatial frequency component which expresses details. In this coding and transmission control scheme for video multicast, the above-mentioned six types of layered coded data are distributed from the image server to the audiovisual terminals through six channels.

SUMMARY OF THE INVENTION

When data is transmitted over an IP (Internet Protocol) network which is one of best-efforts networks, congestion in the transmission network, if occurs, causes discard in packets. Given that the data to transmit is image data, part of data constituting an image frame or a slice is discarded. Discarding some of the data that constitutes an image frame or a slice produces the same problem as the phenomenon described in the paragraph on the ATM transmission in the related art. That is, even though the entire image-frame or slice data including the discarded packets becomes invalid, those invalid packets continue to be transmitted after the packet discard, producing the problem of wasted transmission channel bandwidths.

Moreover, initiating packet discard during the transmission of image-frame or slice data has a problem that image data transmitted already becomes invalid. Terminating packet discard during the transmission of image-frame or slice data to start packet transmission produces another problem of transmitting invalid data until the next image frame or slice is started. Furthermore, in the cases of data multicast distribution, starting duplication in the middle of image-frame data to perform multicast distribution causes a problem of distributing invalid data until the top of the next frame data.

For example, in the transmission of layered audiovisual data consisting of a plurality of streams described in the paragraphs on the related art, each layer of data is packetized into a plurality of packets (here, referred to as "packet group") for transfer. In this case, packets storing the higher spatial components of I, P, and B pictures have lower priorities since frames can be reproduced without the higher spatial frequency components of I, P, and B pictures. When congestion occurs in the layered audiovisual data transmission using a conventional router, however, data packets are discarded at random as shown in FIG. 25. This means that even important data packets can be discarded, which produces a problem of a high incidence of errors in the image data decoding and reproduction, or a problem of suspended replay. For this reason, it is important to transmit image data in layers and, when data discard is required, to discard low-priority data packets selectively. Even of the packet groups with lower priorities, however, some packets being transmitted to a receiver reproducer while other packets not being transmitted thereto results in errors because of image data decoding. This means a problem that the frame is replayed with screen flickering and other effect on image quality.

In view of the foregoing, it is an object of the present invention to provide a data transmission scheme and transmission apparatus for dividing meaningful data structures such as image frames and slices for IP packet transmission and performing packet discard on transmission network congestion, the scheme and apparatus making effective use of transmission channel bandwidths.

Another object of the present invention is to provide a data transmission scheme and transmission apparatus which make effective use of transmission channel bandwidths during data multicast distribution.

Still another object of the present invention is to provide a data transmission scheme and transmission apparatus for discarding low-priority packet data on transmission network congestion while transmitting audiovisual data consisting of a plurality of streams, the scheme and apparatus being capable of avoiding uneven replay in receiver reproducers.

The present invention achieves the foregoing objects by dividing meaningful data structures such as image frames and slices for IP packet transmission, and when packet discard is required due to transmission network congestion, initiating/terminating packet discard in accordance with the beginning of meaningful data (image frame or slice) rather than in the middle of the meaningful data.

The present invention also achieves the foregoing objects by initiating packet duplication at the time of data multicast distribution in accordance with the beginning of meaningful data such as image frames and slices rather than initiating the duplication in the middle of the meaningful data.

Furthermore, the present invention achieves the foregoing objects by performing, when discarding low-priority packet data during the transmission of audiovisual data consisting of a plurality of streams, the discard in steps of packet groups that belong to low-priority layers as shown in FIG. 24, i.e., by performing selective transmission in which data packets belonging to each layer are transmitted on an all-or-none basis.

To be more specific, the following means are adopted.

Firstly, the present invention adopts: means for adding, when distributing audiovisual data consisting of a plurality of streams such as the layered coded data described in the related art (hereafter, referred to as "layered audiovisual") from a server in packets, sequence-number-attached layered headers to the data by each stream for layered packetization; means for converting the layered-packetized data into UDP (User Datagram Protocol) packet data and then into IP (Internet Protocol) packet data; and means for adding identifier (hereinafter, referred to as "flow identifier") data for identifying each stream constituting the layered audiovisual, along with identifier (hereinafter referred to as "control code") data for initiating or terminating the discard of packet data, to a DS (Differentiated Services) field value attached to the headers in the IP packet data, thereby IP-packetizing the layered audiovisual data for distribution.

Secondly, the present invention provides an IP packet data transfer apparatus, which adopts means for retaining flow identifier data of layered audiovisual data to be processed on the occurrence of congestion, along with control code data for initiating or terminating the discard of packet data, and when congestion occurs, performing discard initiation or termination on data having the flow identifier data indicating the layered audiovisual data retained, based on the control code data for performing the discard-initiating or -terminating operation of the packet data.

Thirdly, the present invention provides a server for shaping layered audiovisual data, which adopts means for retaning flow identifier data of layered audiovisual data to be processed when the sequence numbers in the layered packet data of the layered audiovisual data to be processed are discontinuous, along with control code data for initiating or terminating the discard of Ip packet data, and when any of the layered audiovisual streams to be processed shows a predetermined discontinuity in its sequence numbers, performing discard initiation or termination on the IP packet data having the retained flow identifier data of the layered audiovisual stream to be processed, based on the control code data for performing discard initiation or termination of packet data, to achieve data shaping.

Fourthly, the present invention provides an audiovisual terminal for receiving and reproducing layered audiovisual data. This terminal adopts means for retaining flow identifier data of layered audiovisual data to be processed when the sequence numbers in the layered packet data of the layered audiovidual data to be processed are discontinous, along with control code data for initiating or termianting the discard of IP packet data, and when any of the layered audiovisual sterams to be processed shows a predetermined discontinuity in its sequence numbers, performing dicard initiation or termination on IP packet data having the retained flow identifier data of the layered audiovisual stream to be processed, based on the control code data for performing discard initiation or discard termination of packet data, to achieve data shaping.

Fifthly, the present invention provides a data conversion server for converting IP packet data into MPLS (Multi-Protocol Label Switching) packet data, in which means for generating label data from the DS value (flow identifier data and control code data) are adopted.

Sixly, the present invention provides an apparatus for performing MPLS-based packet data transfer, the apparatus adopting means for retaining labels to be processed upon congestion, and when congestion occurs, performing discard initiation or dicard termiantion of MPLS packet data.

Specifically, a packet data transfer method according to the present invention is a packet data transfer method for an IF (Internet Protocol) network or an MPLS (multiprotocol label switching) network, comprising the steps of: retaining identifier (flow identifier) data for identifying data to be processed and identifier (control code) data for controlling the processing, in a packet data transfer apparatus having a plurality of I/O ports; receiving packet data provided with the flow identifier data and control code data; and in discarding packet data identified by the flow identifier data upon congestion in the packet data transfer apparatus, performing discard initiation or termination based on the control code data. when the control code data is an initiating code, the discard initiation and discard termination of the packet data identified as packet data to be processed are conducted at packet data including predetermined control code (initiating code) data.

When the control code data is a terminating code, the discard initiation and discard termination of the packet data identified as packet data to be processed are conducted at packet data that follows packet data including control code (terminating code) data.

When the flow identifier data indicates image data, the control code data may be generated from any of a sequence initiation code, a GOP (Group Of Pictures) initiation code, a picture (image frame) initiation code, and a slice initiation code included in the image data.

The packet data transfer method may be arranged so that: a buffer data amount at the output stage of the packet data transfer apparatus is monitored as to whether or not it is greater than or equal to a predetermined amount (hereinafter, referred to as "discard initiation/termination point"); if the buffer data amount increases to reach or exceed the discard initiation/termination point, and packet data including predetermined control code data and flow identifier data is received, then the discard of packet data including that flow identifier data is initiated; and if the buffer data amount decreases to fall below the discard initiation/termination point, and packet data including predetermined control code data and flow identifier data is received, then the discard of packet data including that flow identifier data is terminated.

The method may also be arranged so that: a plurality of discard initiation/termination points are established in association with different flow identifier data each; the buffer data amount is monitored as to whether or not it is greater than or equal to the plurality of discard initiation/termination points established; if the buffer data amount increases to reach or exceed any of the discard initiation/termination points, and packet data including predetermined control data and the flow identifier data associated with that discard initiation/termination point is received, then the discard of packet data including that flow identifier data is initiated; and if the buffer data amount decreases to fall below any of the discard initiation/termination points, and packet data including predetermined control code data and the flow identifier data associated with that discard initiation/termination point is received, then the discard of packet data including that flow identifier data is terminated.

Moreover, the method may be arranged so that: a buffer data amount at the output stage of the packet data transfer apparatus is monitored as to whether or not it is greater than or equal to a first predetermined amount (hereinafter, referred to as "discard initiation point"), and whether or not it is greater than or equal to a second predetermined amount (hereinafter, referred to as "discard termination point") smaller than the first predetermined amount; if the buffer data amount increases to reach/exceed the discard initiation point, and packet data including predetermined control code data and flow identifier data is received, then the discard of packet data including that flow identifier data is initiated; and if the buffer data amount decreases to fall below the discard termination point, and packet data including predetermined control code data and flow identifier data is received, then the discard of packet data including that flow identifier data is terminated.

Furthermore, the method may be arranged so that: a plurality of discard initiation points and discard termination points are established in association with different flow identifier data each; the buffer data amount is monitored as to whether or not it is greater than or equal to the plurality of discard initiation points established, and whether or not it is greater than or equal to the plurality of discard termination points established; if the buffer data amount increases to reach or exceed any of the discard initiation points, and packet data including predetermined control data and the flow identifier data associated with that discard initiation point is received, then the discard of packet data including that flow identifier data is initiated; and if the buffer data amount decreases to fall below any of the discard termination points, and packet data including predetermined control code data and the flow identifier data associated with that discard termination point is received, then the discard of packet data including that flow identifier data is terminated.

Another packet data transfer method according to the present invention is a packet data transfer method for transferring packet data by using a router comprising a plurality of ingress cards each for establishing connection with an input line, a plurality of egress cards each having a data discard function and a buffer, for establishing connection with an output line, and a switch connected to the plurality of ingress cards and the plurality of egress cards, the packet data being a plurality of pieces of packet data into which layered coded image frame data is packetized by layer, having a header including a field to be set with destination address information, a field to be set with flow identifier data for identifying each layer, and a field to be set with control code data for initiating/terminating discard. Here, packet data input to the ingress cards is transferred to the switch so that the packet data is transferred to egress cards corresponding to the value of its address field. If the amount of packet data residing in any of the buffers exceeds a predetermined threshold value, the packet data to be input to that buffer is discarded by layer, based on the control code data and depending on the flow identifier data.

A packet data transfer apparatus according to the present invention comprises a plurality of ingress cards each for establishing connection with an input line, a plurality of egress cards each having a data discarding function and a buffer, for establishing connection with an output line, and a switch connected to the plurality of ingress cards and the plurality of egress cards. This packet data transfer apparatus transfers packet data input to the ingress cards to the switch so that the packet data is transferred to egress cards corresponding to the value of its address field, the packet data being a plurality of pieces of packet data into which layered coded image frame data is packetized by layer, having a header including a field to be set with destination address information, a field to be set with flow identifier data for identifying each layer, and a field to be set with control code data for initiating/terminating discard. The packet data transfer apparatus further comprises means for discarding, when the amount of packet data residing in any of the buffers exceeds a predetermined threshold value, the packet data to be input to that buffer by layer based on the control code data and depending on the flow identifier data.

A data distribution scheme according to the present invention is a data distribution scheme on an IP network, for distributing transmission data with flow identifier data for identifying the transmission data and control code data for controlling the discard initiation or termination of the transmission data in the middle of transmission arranged in a DS (Differentiated Services) field in the IP packet header thereof.

Another data distribution scheme according to the present invention is a data distribution scheme on an MPLS network, for distributing transmission data with flow identifier data for identifying the transmission data and control code data for controlling the discard initiation or termination of the transmission data in the middle of transmission arranged in a label field in the MPLS packet header thereof.

A packet data generating method according to the present invention is a packet data generating method for generating packet data from layered data consisting of a plurality of streams. Here, flow identifier data for identifying each layered data to be transmitted and control code data for initiating or terminating a discard operation when congestion occurs during transmission are added to each piece of the layered data partitioned by predetermined size, to form layered packet data. UDP (User Datagram Protocol) headers are added thereto for UDP packetization.

A data shaping method according to the present invention comprises the steps of: receiving a data sequence which is distributed after created in such a manner that flow identifier data for identifying each layered data in layered data consisting of a plurality of streams, a sequence number to be consecutively given to data partitioned by predetermined size, and control code data for initiating or terminating a discard operation of each layered data are added to each layered data partitioned by the predetermined size to create layered packet data, followed by UDP packetization and IP packetization; reconstructing UDP packet data and the layered packet data from the IP packet data row received, and discarding data from which UDP data is not reconstructible; checking for continuity in the sequence numbers of the reconstructed layered packet data by each flow identifier data; and when the sequence numbers are discontinuous, and if the control code data is control code data for initiating the discard operation, discarding subsequently-received layered packet data up to the one immediately preceding the layered packet data including the next control code data, and if the control code data is control code data for terminating the discard operation, discarding subsequently-received layered packet data up to the one including the next control code data, applying UDP packetization and IP packetization to following layered packet data, and distributing the resultant to the same destination as that at reception.

A data shaping apparatus according to the present invention comprises: means for receiving data created in such a manner that flow identifier data for identifying each layered data in layered data consisting of a plurality of streams, a sequence number to be consecutively given to data partitioned by predetermined size, and control code data for initiating or terminating a discard operation of each layered data are added to each layered data partitioned by the predetermined size to create layered packet data, followed by UDP packetization and IP packetization; means for reconstructing UDP packet data and layered packet data from the IP packet data received; means for discarding data if UDP data is not reconstructible from the data; means for checking for continuity in the sequence numbers of the reconstructed layered packet data by each flow identifier data; means for discarding, if the control code data is control code data for initiating the discard operation, subsequently-received layered packet data up o to the one immediately preceding the layered packet data including the next control code data, as well as discarding, if the control code data is control code data for terminating the discard operation, subsequently-received layered packet data up to the one including the next control code data, applying UDP packetization and IP packetization to following layered packet data, and distributing the resultant to the same destination as that at the time of reception, in the cases where the sequence numbers are discontinuous; and means for applying, in the cases where the sequence numbers are continuous, UDP packetization and IP packetization to all layered packet data received and distributing the resultant to the same destination as that at reception.

A decoding scheme according to the present invention comprises the steps of: receiving an IP packet data row which is distributed after created in such a manner that flow identifier data for identifying each layered program data in layered audiovisual program data consisting of a plurality of audiovisual streams, a sequence number to be consecutively given to data partitioned by predetermined size, and control code data for initiating or terminating a discard operation of each layered data are added to each layered data partitioned by the predetermined size to create layered packet data, followed by UDP packetization and IP packetization; reconstructing UDP packet data and the layered packet data from the IP packet data row received; discarding data if UDP data is not reconstructible from the data; checking for continuity in the sequence numbers of the reconstructed layered packet data by each flow identifier data; and when the sequence numbers are discontinuous, and if the control code data is control code data for initiating the discard operation, discarding subsequently-received layered packet data up to the one immediately preceding the layered packet data including the next control code data, and if the control code data is control code data for terminating the discard operation, discarding subsequently-received layered packet data up to the one including the next control code data and decoding following layered packet data.

A data decoding and displaying apparatus according to the present invention comprises: means for receiving IP packet data which is distributed after created in such a manner that flow identifier data for identifying each layered program data in layered audiovisual program data consisting of a plurality of audiovisual streams, a sequence number to be consecutively given to data partitioned by predetermined size, and control code data for initiating or terminating a discard operation of each layered data are added to each layered data partitioned by the predetermined size to create layered packet data, followed by UDP packetization and IP packetization; means for reconstructing UDP packet data and layered packet data from the IP packet data received; means for discarding data if UDP data is not reconstructible from the data; means for checking for continuity in the sequence numbers of the reconstructed layered packet data by each flow identifier data; means for discarding, if the control code data is control code data for initiating the discard operation, subsequently-received layered packet data up to the one immediately preceding the layered packet data including the next control code data, and if the control code data is control code data for terminating the discard operation, discarding subsequently-received layered packet data up to the one including the next control code data and decoding following layered packet data, in the cases where the sequence numbers are discontinuous; means for decoding, in the cases where the sequence numbers are continuous, all the layered packet data received; and means for displaying the decoded data.

A packet data duplicating and distributing method (data multicast distribution method) according to the present invention comprises the steps of: retaining flow identifier data for identifying data to be duplicated and control code data for controlling the duplication processing; and when packet data provided with the flow identifier data and control code data is received, and the packet data identified is to be duplicated, performing duplication initiation and duplication termination on the packet data having the retained flow identifier data based on the control code data.

A duplicating and distributing apparatus (data multicast distribution apparatus) according to the present invention comprises: means for retaining flow identifier data for identifying data to be duplicated and control code data for controlling the duplication processing; means for receiving packet data provided with the flow identifier data and control code data; and means for performing, when the packet data is to be duplicated, duplication initiation and duplication termination on the packet data having the retained flow identifier data based on the control code data.

BRIEF DESCRIPTION OF THE DRAWINGS

In the accompanying drawings:

FIG. 4 is a chart showing the relations between transmission data and DS (Differentiated Services) field values (flow identifier data, control code data) according to the present invention;

FIG. 5 is a block diagram showing another example of the packet data transfer apparatus according to the present invention;

FIG. 17 is a chart showing an example of the label data configuration in the MPLS (Multi-Protocol Label Switching) packet data according to the present invention;

FIG. 24 is an explanatory diagram showing the image data transmission by a router according to the present invention; and FIG. 25 is an explanatory diagram showing the image data transmission by a conventional router.

DESCRIPTION OF THE PREFERRED EMBODIMENTS

Hereinafter, embodiments of the present invention will be described in detail with reference to the drawings.

Figure 3:
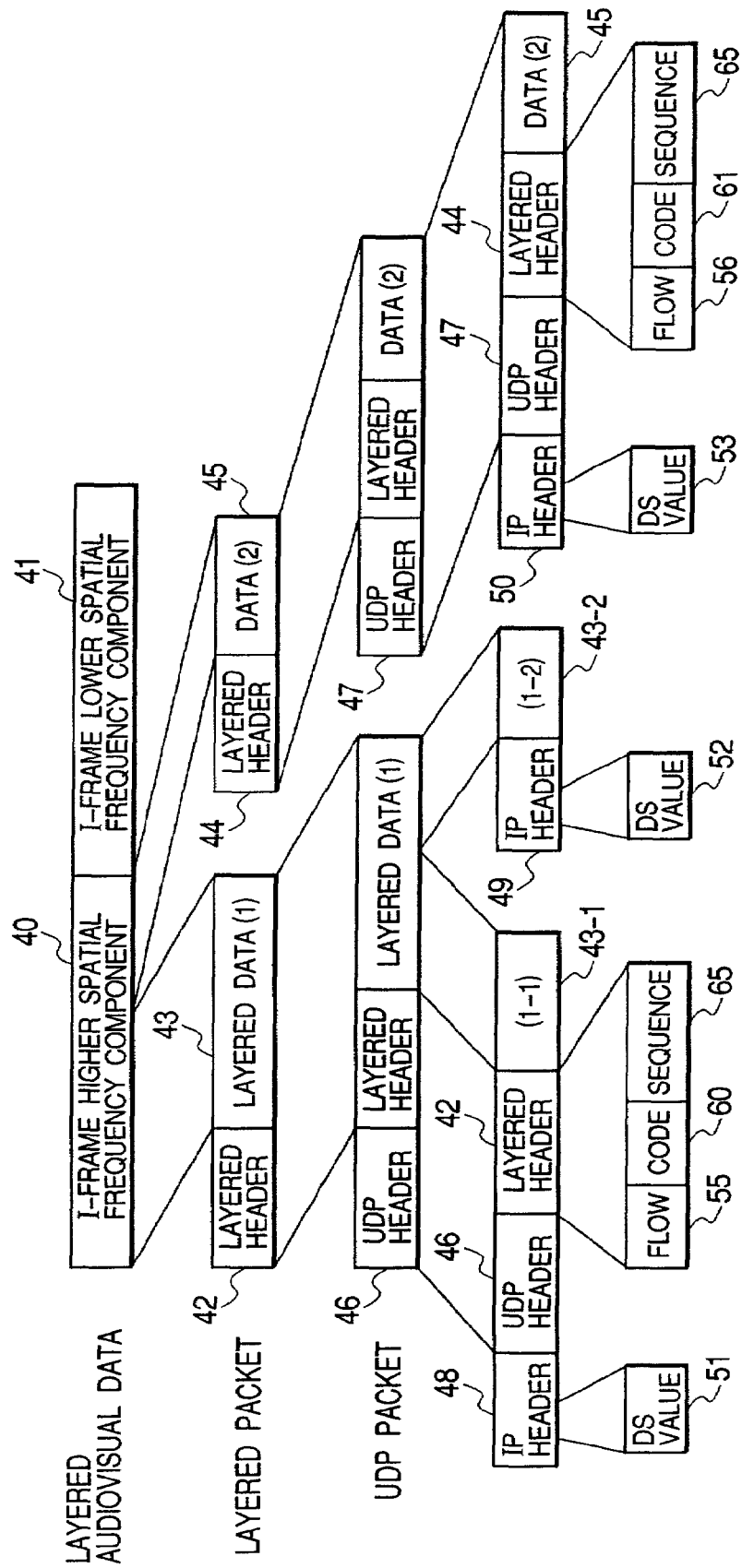
FIG. 3 is a diagram showing a configuration example of the packet data according to the present invention.

Initially, description will be given of the data structure employed in the present embodiment. FIG. 3 shows a method of converting layered audiovisual data into IP packet data, used in the present embodiment. Here, the description will be given with high spatial frequency component data 40 and low spatial frequency component data 41 of I-frame MPEG video data (MPEG-1 or MPEG-2) as an example of the layered audiovisual data. The layered audiovisual data 40 to be distributed is divided by a predetermined size, e.g. 4 Kbytes, into layered data (1) and layered data (2) or 43 and 45. Layered headers 42 and 44 are attached thereto, respectively, to form layered packet data. Here, the layered headers 42 and 44 each consist of 4-bit identifier (hereinafter, referred to as "flow identifier") data for identifying the layered data, 4-bit identifier (hereinafter, referred to as "control code") data for indicating whether the layered data is at the top or in the middle of layered frame data, and a 16-bit sequence number which is consecutively given to each of the streams constituting the layered audiovisual data. The values of the flow identifier data and the control code data will be described in detail with reference to FIG. 4. As for the sequence numbers, hexadecimal values 0x0000-0xFFFF are cyclically given to the I-frame higher spatial frequency component data 40 and lower spatial frequency component data 41 individually. Note that while the flow identifier data and control code data of four bits and the sequence numbers of sixteen bits are employed here, other values may also be used.

The data 42 and 43, as well as 44 and 45, in the form of layered packet data are provided with UDP headers 46 and 47 at their respective tops, to constitute UDP packet data. Moreover, the data 46, 42, and 43, as well as 47, 44, and 45, in the form of UDP packet data are divided by a predetermined size, i.e. 1480 bytes, and provided with IP headers 48, 49, 50 at the respective tops, thereby constituting IP packet data. FIG. 3 shows an example where the size of the UDP packet data consisting of the data 46, 42, and 43 exceeds 1480 bytes. The layered data (1), or 43, is thus divided into 43-1 and 43-2 before converted into IP packet data.

The DS values, designated by the reference numerals 51, 52, and 53, will be described later with reference to FIG. 4. These value are set in accordance with the data to be transmitted by the IP packet data. They consist of flow identifier data for identifying each of the streams constituting layered audiovisual data, and control code data for executing packet data discard initiation or termination. These DS values (data 51, 52, 53) are generated on the basis of the flow identifier data (the data 55, 56) and the control code data (the data 60, 61) in the layered headers mentioned above. The sequence data, designated by 65 and 66, are 16-bit sequence numbers to be consecutively given to each stream as described before.

FIG. 4 details the DS values to be set in accordance with the contents of data transmitted by IP packet data. For example, the DS value 51 in FIG. 3 is determined by the contents of the data 43-1 to be transmitted. The DS value 52 is determined by the contents of the data 43-2.

The data 43-1 described in FIG. 3 is I-frame higher spatial frequency component data, and thus has flow identifier data of 0x5. Since the data 43-1 is the top data of the I-frame higher spatial frequency component data, its control code data is set with 0xD. As a whole, the DS value shown by 51 in FIG. 3 is 0x5D because of the flow identifier data (0x5) and the control code data (0xD). The data 43-2 in FIG. 3 is I-frame higher spatial frequency component data, and thus has flow identifier data of 0x5. Since the data 43-2 is the intermittent data of the I-frame higher spatial frequency component data, its control code data is set at 0xC. As a whole, the DS value shown by 52 in FIG. 3 is 0x5C because of the flow identifier data (0x5) and the control code data (0xC). Moreover, the data 45 in FIG. 3 is I-frame higher spatial frequency component data, and thus has flow identifier data of 0x5. Since the data 45 is the intermittent data of the I-frame higher spatial frequency component data, its control code data is set at 0xC. As a result, the DS value shown by 53 in FIG. 3 is 0x5C on the whole, because of the flow identifier data (0x5) and the control code data (0xC).

The components other than the I-frame higher spatial frequency component described above are as shown in FIG. 4. That is, when the data to be transmitted by IP packet data is an I-frame lower spatial frequency component, flow identifier data of 0x6 is provided. A P-frame lower spatial frequency component is provided with flow identifier data of 0x4, and a P-frame higher spatial frequency component is provided with flow identifier data of 0x3. Besides, when the data to be transmitted by IP packet data is a B-frame lower spatial frequency component, flow identifier data of 0x2 is provided. A B-frame higher spatial frequency component is provided with flow identifier data of 0x1. As for control code data, 0xD is given when the data to be transmitted is the top data of each picture frame. Control code data of 0xC is given in the cases of the intermittent data of a picture frame. The foregoing are the relations between the contents of data to be transmitted by IP packet data and the DS values, whereas settings other than the values set in FIG. 4 may be used. The codes for controlling the discard initiation and termination of packet data are set depending on whether or not the data is at the top of a picture frame. However, the settings may also be made depending on other distinctions, such as whether or not at the top of GOP (Group Of Pictures), or whether or not at the top of a slice in the picture frame.

Figure 1:
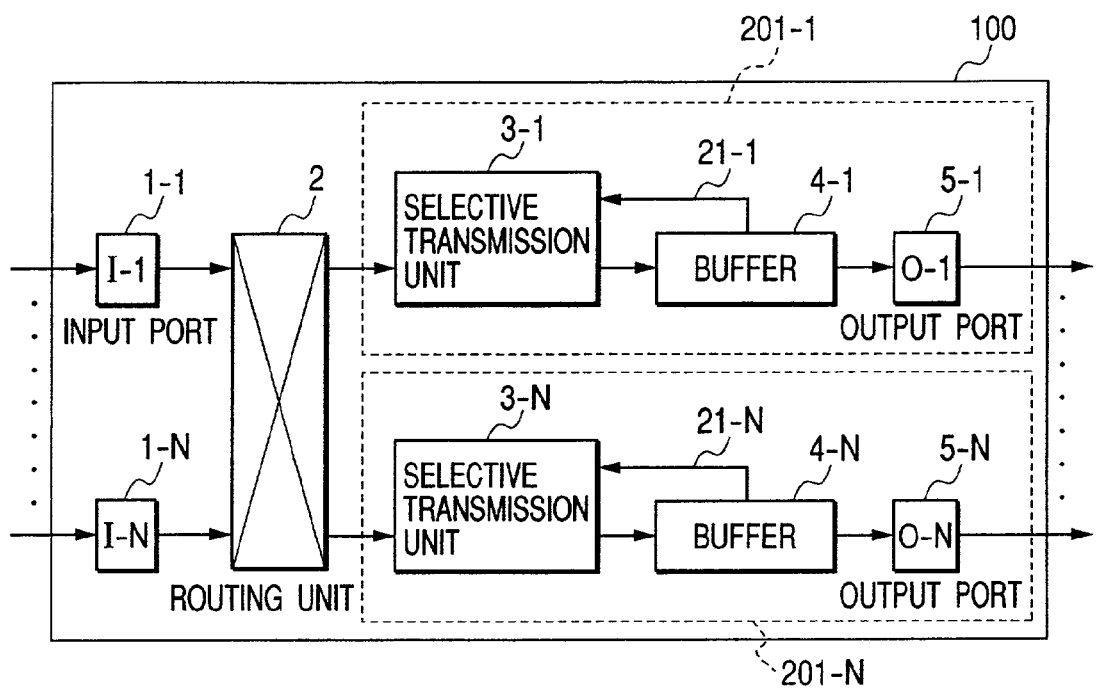
FIG. 1 is a block diagram showing an example of the packet data transfer apparatus according to the present invention.

FIG. 1 is a diagram showing the configuration of a packet data transfer apparatus 100 according to an embodiment of the present invention. Specifically, the packet data transfer apparatus 100 comprises input ports 1 (1—1 to 1-N) for establishing connection with a plurality of input lines, a routing unit 2 for routing packet data, selective transmission units 3 (3-1 to 3-N) for selectively transmitting data that are routed for a plurality of output lines, buffers 4 (4-1 to 4-N) connected to the respective selective transmission units, and output ports 5 (5-1 to 5-N) for establishing connection with the plurality of output lines. The input ports 1 (1—1 to 1-N) may be made out of ingress cards. Then, the selective transmission units 3 (3-1 to 3-N), the buffers 4 (4-1 to 4-N) connected to the respective selective transmission units, and the output ports 5 (5-1 to 5-N) for establishing connection with the plurality of output ports may be formed as egress cards 201 (201-1 to 201-N).

Next, description will be given of the operation of the packet data transfer apparatus 100. The packet data transfer apparatus 100 initially receives IP packet data shown in FIG. 3, such as the IP packet data consisting of the data 48, 46, 42, and 43-1, through a plurality of input ports 1 (1—1 to 1-N) The IP packet data received are routed through the routing unit 2 to predetermined output ports (here, any of the selective transmission units 3-1 to 3-N), depending on the destination addresses in the IP packet headers.

The packet data transferred to the selective transmission units 3 (3-1 to 3-N) are determined whether or not to be transmitted from the selective transmission units 3 (3-1 to 3-N) to the buffers 4 (4-1 to 4-N) connected at the subsequent stage, based on data amount signals 21 (21-1 to 21-N) from the buffers.

The packet data transfer apparatus 100 in FIG. 1 exemplifies the case of monitoring if the amounts of data in the buffers 4 (4-1 to 4-N) reach/exceed a predetermined data amount (the point of in-buffer data amount at which packet data discard should be initiated or terminated). Here, whether or not the amounts of data in the buffers 4 (4-1 to 4-N) reach/exceed the predetermined amount is notified to the selective transmission units 3 (3-1 to 3-N) by the signals 21 (21-1 to 21-N). Thereby, it is determined whether or not the IP packet data are to be transmitted from the selective transmission units 3 (3-1 to 3-N) tothebuffers4 (4-1 to 4-N). In the cases of transmission, the IP packet data are transmitted from the selective transmission units 3 (3-1 to 3-N) to the buffers 4 (4-1 to 4-N). In the cases of no transmission (or discard), the IP packet data are not transmitted from the selective transmission units 3 (3-1 to 3-N) to the buffers 4 (4-1 to 4-N), and are discarded within the selective transmission units 3 (3-1 to 3-N). Incidentally, the operation of the selective transmission units 3 (3-1 to 3-N) will be described later with reference to FIG. 2. The IP packet data transmitted into the buffers 4 (4-1 to 4-N) are distributed to the output lines from the output ports 5 (5-1 to 5-N).

Figure 2:
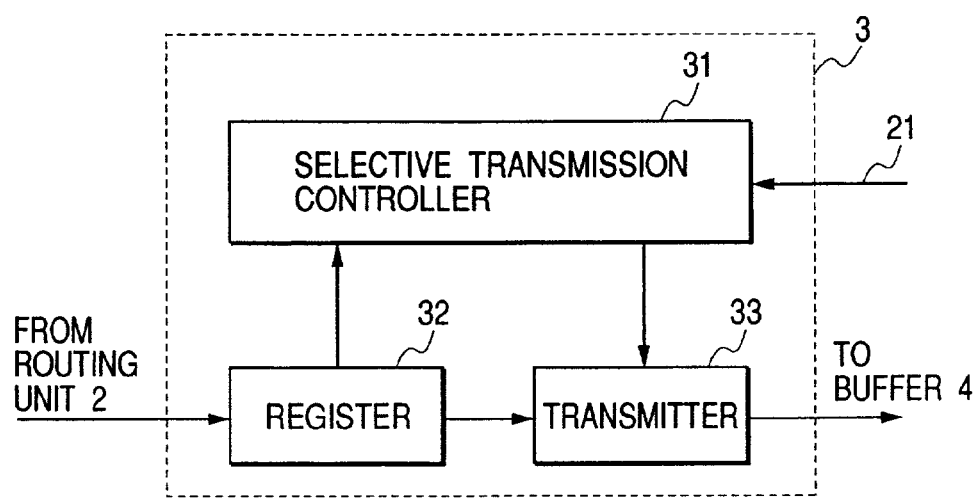
FIG. 2 is a block diagram of a selective transfer unit in the packet data transfer apparatus shown in FIG. 1.

FIG. 2 is a diagram showing the detailed configuration of a selective transmission unit 3. A selective transmission unit 3 comprises a selective transmission controller 31, a register 32 for retaining data temporarily, and a transmitter 33 for executing data transmission. IP packet data routed by the routing unit 2 is temporarily retained in the register 32 so that the selective transmission controller 31 analyzes the DS value in the IP header. The selective transmission controller 31 previously stores and retains the flow identifier data and discard initiating/terminating control code data of IP packet data to be discarded when the amount of data in the buffer 4 reaches/exceeds a predetermined amount (under congestion). Here, description will be given with the assumption that the flow to be discarded upon the congestion of the buffer 4 is the B-frame higher spatial frequency component (flow identifier data 0x1).

Moreover, packet discard is initiated at packet data including the control code data of 0xD. Flows under discard are flagged as being discarded, and the flag is stored and retained in the selective transmission controller 31. When the discard flag is on and the congestion of the buffer 4 is resolved, the transmission to the buffer 4 is initiated from packet data including the control code data of 0xD. That is, when the buffer 4 is in congestion, the discard is held back as long as packet data including the DS value of 0x1C is received. The discard is initiated after the reception of IP packet data with 0x1D. The selective transmission controller 31 also controls the transmitter 33 so that when the discard flag is on and the congestion of the buffer 4 is resolved, the discard is not terminated as long as packet data including the DS value of 0x1C is received, and the discard is terminated after the reception of IP packet data with 0x1D. Under the control of the selective transmission controller 31, the transmitter 33 performs either operation, transmitting data read from the register to the buffer or discarding the same.

The foregoing are the configuration and operation of the selective transmission unit 3. Incidentally, in the selective transmission and discard described with reference to FIGS. 1 and 2, only a single discard initiation/termination point is established on the amount of data in a buffer so that the transmission and discard are selectively performed for a signal layer alone. However, two or more discard initiation/termination points may be provided so that selective transmission and discard are performed for two or more layers. To describe an example where two discard initiation/termination points are provided to transmit and discard two layers of packet data selectively, the selective transmission controller 31 previously stores and retains the flow identifier data and discard-initiating/terminating control code data of IP packet data to be discarded when the amount of data in the buffer 4 exceeds a discard initiation/termination point 1, as well as the flow identifier data and discard-initiating/ terminating control code data of IP packet data to be discarded when the amount of data in the buffer 4 exceeds a discard initiation/termination point 2 (the discard initiation/termination point 2>the discard initiation/termination point 1).

For example, description will be given with the assumption that the flow to be discarded when the amount of data in the buffer 4 exceeds the discard initiation/termination point 1 is the B-frame higher spatial frequency component (flow identifier data 0x1), and that the flow to be discarded in addition to the above-mentioned flow when the discard initiation/termination point 2 is exceeded is the B-frame lower spatial frequency component (flow identifier data 0x2) Besides, the packet discard is initiated at packet data including the control code data of 0xD. Flows under discard are flagged as being discarded, and the flag is stored and retained in the selective transmission controller 31. When the discard flag is on and the congestion of the buffer 4 is resolved, the transmission to the buffer 4 is initiated from packet data including the control code data of 0xD.

That is, when the buffer 4 comes into congestion and the amount of data in the buffer 4 exceeds the discard initiation/termination point 1, the discard is held back as long as packet data including the DS value of 0x1C is received. The discard of the B-frame higher spatial frequency component is initiated after the reception of IP packet data with 0x1D. When the amount of data in the buffer 4 exceeds the discard initiation/termination point 2, the flows with the flow identifier data 0x1 keep being discarded. Meanwhile, as for the B-frame lower spatial frequency components, the discard is held back as long as packet data including the DS value of 0x2C is received. The discard is initiated after the reception of IP packet data with 0x2D. When the discard flags are set on the B-frame higher and lower spatial frequency components and the amount of data in the buffer 4 falls below the discard initiation/termination point 2, the transmission of the B-frame lower spatial frequency component TO (flow identifier data 0x2) is initiated at packet data including the control code data 0xD. The B-frame higher spatial frequency component (flow identifier data 0x1) continues to be discarded. Likewise, when the discard flag is set on the B-frame higher spatial frequency component and the amount of data in the buffer 4 falls below the discard initiation/termination point 1, the selective transmission controller 31 controls the transmitter 33 so as not to terminate the discard as long as packet data including the DS value of 0x1C is received. The discard is terminated after the reception of IP packet data with 0x1D.

FIG. 5 shows a modified example 110 of the packet data transfer apparatus 100 according to the embodiment of the present invention. Input ports 1 (1—1 to 1-N) may be made out of ingress cards. Selective transmission units 13 (13-1 to 13-N), buffers 14 (14-1 to 14-N) connected to the respective selective transmission units, and output ports 5 (5-1 to 5-N) for establishing connection with a plurality of output ports may be formed as egress cards 202 (201-1 to 201-N).

The following is a difference between the packet data transfer apparatuses 100 and 110. In the packet data transfer apparatus 100 of FIG. 1, whether or not the amounts of data in the buffers 4 reach/exceed a predetermined data amount (the point of in-buffer data amount at which packet data discard should be initiated or terminated) is monitored (the signals 21) to select if the selective transmission units 3 perform packet data transmission. In the packet data transfer apparatus 110 of FIG. 5, the monitoring is made on two points (the signals 22, 23), namely, whether or not the amounts of data in the buffers 14 reach/exceed a first data amount (the point of in-buffer data amount at which packet data discard should be initiated: hereinafter, referred to as "discard initiation point"), as well as reach/exceed a second data amount (the point of in-buffer data amount at which packet data discard should be terminated: hereinafter, referred to as "discard termination points"), to select if the selective transmission units 13 perform packet data transmission.

Here, the first data amount is greater than the second data amount (the discard initiation point>the discard termination point). Hereinafter, referring to FIG. 6, the operation of the packet data transfer apparatus 110 will be described with particular emphasis on the operational differences from the packet data transfer apparatus 100.

Figure 6:
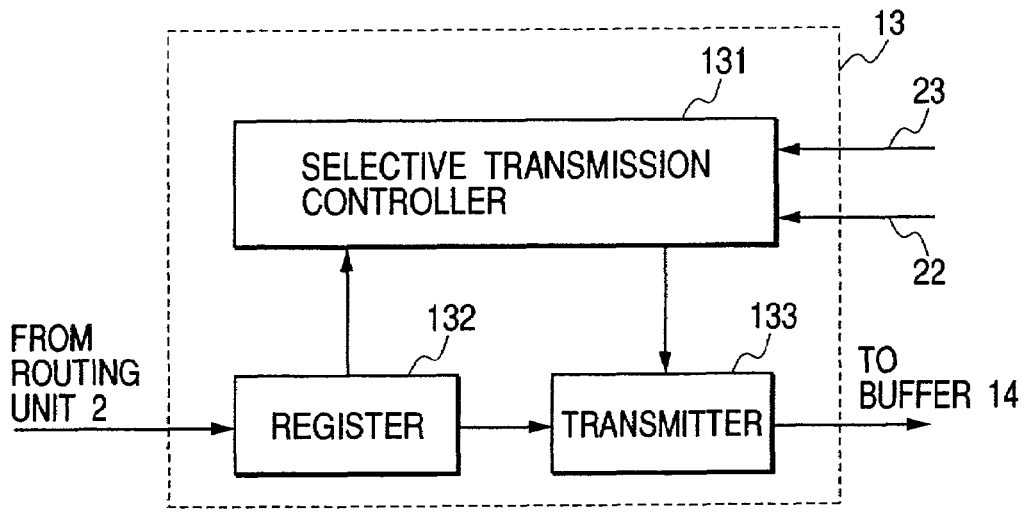
FIG. 6 is a block diagram of a selective transfer unit in the packet data transfer apparatus shown in FIG. 5.

The selective transmission unit 13 shown in FIG. 6 comprises a selective transmission controller 131, a register 132 for retaining data temporarily, and a transmitter 133 for executing data transmission. IP packet data routed by the routing unit 2 is temporarily retained in the register 132 so that the selective transmission controller 131 analyzes the DS value in the IP header. The selective transmission controller 131 previously stores and retains the flow identifier data and discard-initiating control code data of IP packet data to be discarded when the amount of data in the buffer 14 reaches/exceeds a first predetermined amount (discard initiation point), as well as the discard-terminating control code data of the same for situations where the amount of data in the buffer 14 falls below a second predetermined amount (discard termination point). Here, the description will be given with the assumption that the flow to be discarded when the amount of data in the buffer 14 reaches/exceeds the discard initiation point is the B-frame higher spatial component (0x1). Besides, the packet discard is initiated at packet data including the control code data of 0xD. Flows under discard are flagged as being discarded, and the flag is stored and retained in the selective transmission controller 131. When the discard flag is on and the amount of data in the buffer 14 falls below the discard termination point, the transmission to the buffer 14 is initiated from packet data including the control code data of 0xD. That is, even when the amount of data in the buffer 14 reaches/exceeds the discard initiation point, the discard is held back as long as packet data including the DS value of 0x1C is received. The discard is initiated after the reception of IP packet data with 0x1D. The selective transmission controller 131 also controls the transmitter 133 so that when the discard flag is on and the amount of data in the buffer 14 falls below the discard termination point, the discard is not terminated as long as packet data including the DS value of 0x1C is received, and the discard is terminated after the reception of IP packet data with 0x1D.

Under the control of the selective transmission controller 131, the transmitter 133 performs either operation, transmitting data read from the register to the buffer or discarding the same.

The foregoing are the configuration and operation of the selective transmission unit 13. Incidentally, in the selective transmission and discard described with reference to FIGS. 5 and 6, only a single discard initiation point and a single discard termination point are established so that the transmission and discard are selectively performed for a single layer alone. However, two or more discard initiation and termination points each may be provided so that selective transmission and discard are performed for two or more layers. To describe an example where two sets of discard initiation and termination points are provided to transmit and discard two layers of packet data selectively, the selective transmission controller 131 previously stores and retains the following data: the flow identifier data and discard-initiating control code data of IP packet data to be discarded when the amount of data in the buffer 14 reaches/exceeds a first predetermined amount (discard initiation point 1); control code data for terminating the discard when the amount of data in the buffer 14 falls below a second predetermined amount (discard termination point 1); the flow identifier data and discard initiating control code data of IP packet data to be discarded when the amount of data in the buffer 14 reaches/exceeds a third predetermined amount (discard initiation point 2); and control code data for terminating the discard when the amount of data in the buffer 14 falls below a fourth predetermined amount (discard termination point 2). Note that the discard initiation point 2>the discard initiation point 1>the discard termination point 2>the discard termination point 1. Assumed here that the flow to be discarded when the amount of data in the buffer 14 reaches/exceeds the discard initiation point 1 is the B-frame higher spatial frequency component (0x1), and the flow to be discarded at or above the discard initiation point is the B-frame lower spatial frequency component (0x2).

Besides, the packet discard is initiated at packet data including the control code data of 0xD. Flows under discard are flagged as being discarded, and the flag is stored and retained in the selective transmission controller 131. When the discard flag is on and the amount of data in the buffer 14 falls below a discard termination point, the transmission to the buffer 14 is initiated from packet data including the control code data of 0xD. That is, even when the amount of data in the buffer 14 reaches/exceeds the discard initiation point 1, the discard is held back as long as packet data including the DS value of 0x1C is received. The discard of the B-frame higher spatial frequency component (0x1) is initiated after the reception of IP packet data with 0x1D. Similarly, even when the amount of data in the buffer 14 reaches/exceeds the discard initiation point 2, the discard of the B-frame lower spatial frequency component (0x2) is held back as long as packet data including the DS value of 0x2C is received. The discard of the B-frame higher spatial frequency component (0x2) is initiated after the reception of IP packet data with 0x2D. Moreover, the selective transmission controller 131 also controls the transmitter 133 so that even when the B-frame lower spatial frequency component (0x2) is set with the discard flag and the amount of data in the buffer 14 falls below the discard termination point 2, the discard is not terminated as long as packet data including the DS value of 0x2C is received, and the discard is terminated after the reception of IP packet data with 0x2D. In the meantime, the B-frame higher spatial frequency component (0x1) keeps being discarded. The transmitter 133 is controlled so that when the B-frame higher spatial frequency component is set with the discard flag and the amount of data in the buffer 14 falls below the discard termination point 1, the discard is not terminated as long as packet data including the DS value of 0x1C is received, and the discard is terminated after the reception of IP packet data with 0x1D.

Figure 7:
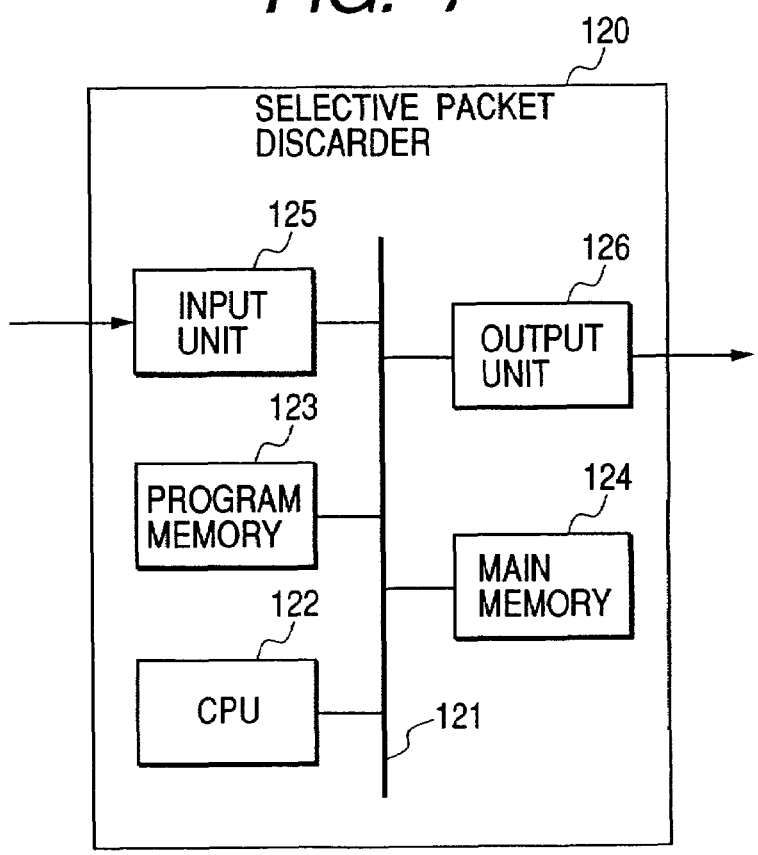
FIG. 7 is a diagram showing the configuration of a data shaping server according to an embodiment of the present invention.

The packet data transfer apparatus described with reference to FIGS. 1 and 5 has been an apparatus which selectively transmits/discards packet data when the transmission network comes into congestion. On the other hand, a data shaping server shown in FIG. 7 is an apparatus which performs data shaping when layered audiovisual data described with reference to FIG. 3 is transmitted thereto as partly discarded at random. The description of the data shaping will be given with the assumption that the data 40 of FIG. 3 is distributed from a program distribution server and is received by a receiver for reproduction.

The data 40 distributed from the program distribution server, when transmitted through a transmission network, should originally be in the forms of the IP packet data consisting of the data 48, 46, 42, and 43-1, the IP packet data consisting of the data 49 and 43-2, and the IP packet data consisting of the data 50, 47, 44, and 45. Nevertheless, if part of the data, e.g., the IP packet data consisting of the data 48, 46, 42, and 43-1 is discarded at some midpoint on the transmission network because of congestion, then the IP packet data consisting of the remaining data 49 and 43-2, and the IP packet data of 50, 47, 44, and 45 are transmitted to the receiver.

At the receiver, the reception of all the data constituting the data 40 allows the I-frame higher spatial frequency component to be reproduced. On the other hand, the reproduction is impossible when the data can only be received in part. Here, data of no use being transmitted to the receiver is transmitted. Thus, in order to discard data of no use being transmitted on the transmission network to make effective use of the transmission network, the data, or the IP packet data consisting of the data 49 and 43-2 and the IP packet data consisting of the data 50, 47, 44, and 45 in the case of the above-mentioned example, is discarded. This means the data shaping. Thereafter, the configuration and operation of the data shaping server 120 will be described with reference to FIG. 7.

The data shaping server 120 shown in FIG. 7 comprises a CPU 122 connected with a bus 121, a program memory 123 storing a data shaping program which runs on the CPU 122, a main memory 124 for storing and retaining data necessary for the data shaping, an input unit 125 for receiving data, and an output unit 126 for outputting shaped data. The data shaping server 120 initially loads the processing program stored and retained in the program memory 123 onto the CPU 122, thereby initiating the shaping of data. Incidentally, the processing operations of the CPU 122 will be detailed later with reference to FIG. 8.

When the processing operation for data shaping is initiated, data input is accepted through the input unit 125. In the main memory 124, the sequence numbers given to the individual layers, or the layered headers of the input data shown in FIG. 3, are monitored for continuity. If discontinuity is detected, the processing for discarding (data shaping) the invalid data is performed as described above. Specifically, the received data is reconstructed into UDP data by each layer, and monitored for completeness as UDP packet data; discard is performed on incomplete data. Data that is complete as UDP data is monitored for the sequence numbers of the individual layers (flow identifier data 0x6-0x1), and checked for continuity. If discontinuous, UDP data including the control code data value of 0xC is discarded until UDP packet data including the control code data value of 0xD, which indicates the top of an image frame, is generated. After the generation of the UDP packet data with the control code data value 0xD, each layer of data received is redistributed as IP packet data from the output unit 126. The foregoing is the schematic processing operations of the data shaping server. Subsequently, the processing operations to be made in the CPU 122 of the data shaping server will be detailed with reference to FIG. 8.

Figure 8:
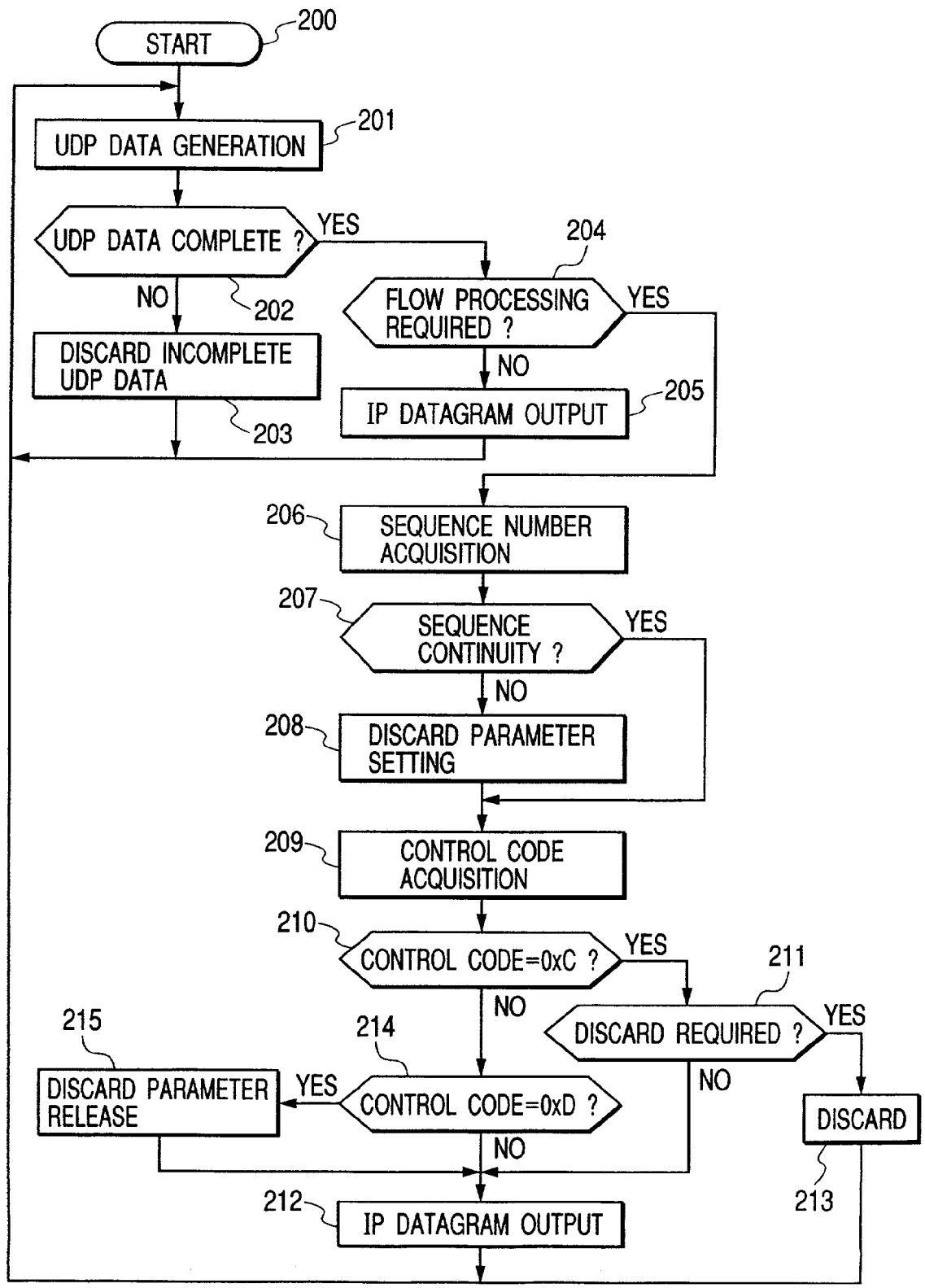
FIG. 8 is a flowchart showing an example of operation of the data shaping server according to the present invention.

FIG. 8 shows a flowchart of the processing to be performed by the CPU 122 in the data shaping server 120.

(1) When the data shaping server 120 is turned on, the data shaping program stored and retained in the program memory 123 is loaded on the CPU 122 to initiate the processing operation for data shaping (step 200).

(2) When the processing operation for data shaping is initiated, UDP data is generated from the IP packet data received from the input unit 125, and checked for completeness as UDP data (step 201, 202).

(3) If the determination at step 202 indicates that part of the UDP data has been discarded and the UDP data is not reconstructible, then the incomplete UDP data is discarded (step 202, 203).

(4) If the UDP data is determined to be reconstructible at step 202, then the UDP data is reconstructed, followed by a determination whether it is a processing-requiring flow (e.g., the flow identifier data 0x6-0x1 in the layered header) or not (step 202, 204).

(5) If it is determined not to be a processing-requiring flow at step 204, the data is redistributed as IP packet data from the output unit 126 (step 204, 205).

(6) If the data is determined to be a processing-requiring flow at step 204, then the sequence number in the layered header is acquired to check for continuity in each layer (step 204, 206, 207).

(7) If the determination at step 207 shows discontinuity in the sequence numbers, the flow in the discontinuous layer is set with a discard parameter, followed by the acquisition of the control code data value in the layered header (step 207, 208, 209). In this connection, when the discard parameter has already been set, the discard parameter setting is kept.

(8) If the determination at step 207 indicates continuity in the sequence numbers, then the control code data value in the layered header is acquired (step 207, 209).

(9) After the acquisition of the control code data value, the control code data value is determined if it is intermittent (0xC) of frame layer data (step 210).

(10) If the control code data value is determined to be intermittent (0xC) of layered frame data at step 210, then a determination is made as to whether it is discard-requiring data or not (step 210, 211).

(11) If it is determined not to be discard-requiring data at step 211, the data is redistributed as IP packet data from the output unit 126 (step 211, 212).

(12) If it is determined to be discard-requiring data at step 211, the data is discarded and the generation of next UDP data is initiated (step 211, 213, 201).

(13) If the control code data value is determined not to be intermittent (0xC) of layered frame data at step 210, then a determination is made as to whether the control code data value is the top (0xD) of layered frame data or not (step 210, 214).

(14) If the control code data value is determined not to be the top (0xD) of layered frame data at step 214, the data is redistributed as IP packet data from the output unit 126 (step 214, 212).

(15) If the control code data value is determined to be the top (0xD) of layered frame data at step 214, the discarding of the corresponding layered frame data is terminated; the data is redistributed as IP packet data from the output unit 126 (step 214, 215, 212). In this connection, when no discard parameter has been set, the redistribution operation is continued. The foregoing is the processing flow to be performed by the CPU 122 in the data shaping server 120.

Figure 9:
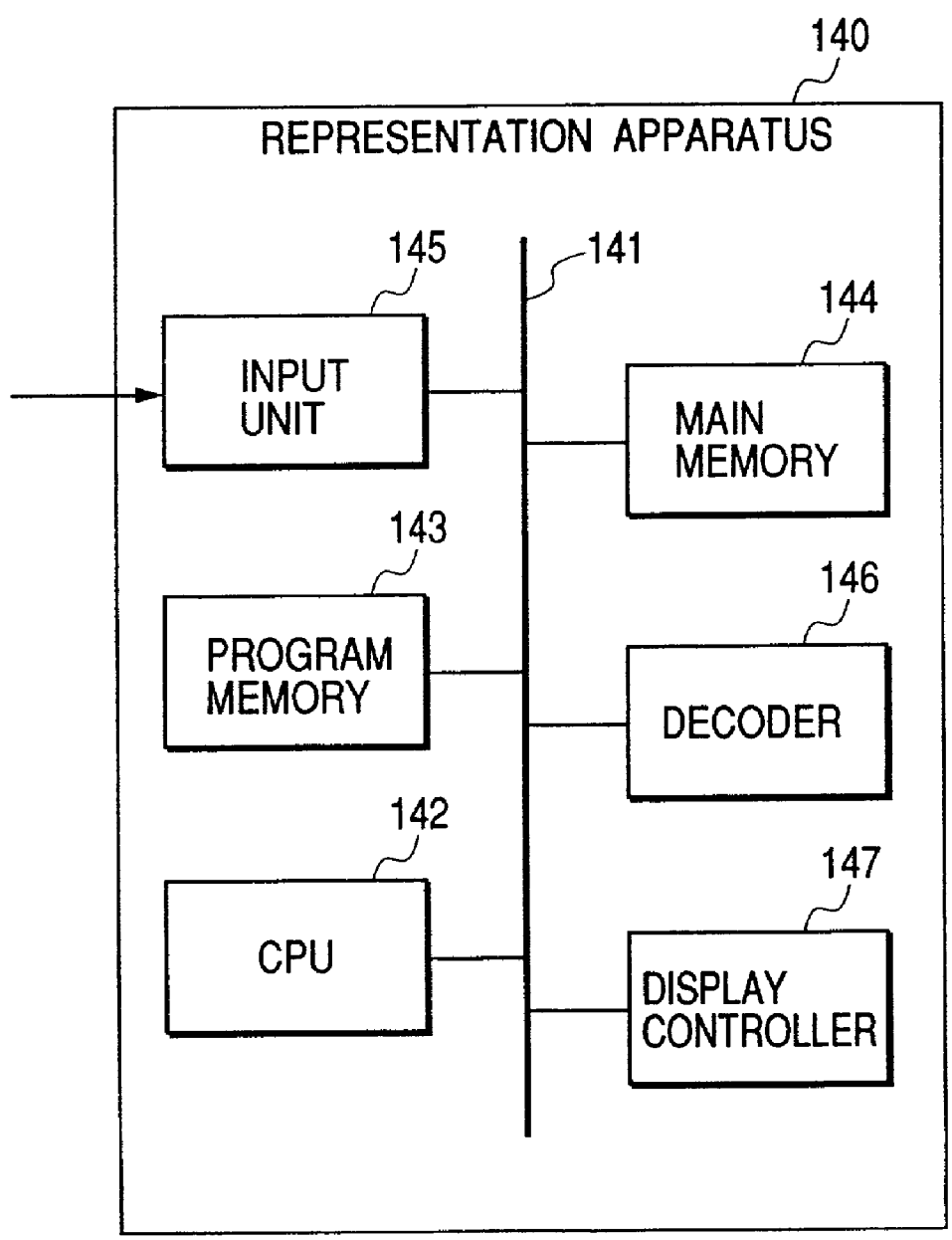
FIG. 9 is a diagram showing a configuration example of the receiver reproducer according to the present invention.

The data shaping server shown in FIG. 7 is an apparatus which performs data shaping for redistribution when the layered audiovisual data shown in FIG. 3 is transmitted thereto as partly discarded at random. On the other hand, a receiver reproducer shown in FIG. 9 is an apparatus in which received data is subjected to shaping, decoded in a decoder, and reproduced in a display controller. The data shaping is basically the same processing as that of the data shaping server.

The receiver reproducer 140 shown in FIG. 9 comprises a CPU 142 connected with a bus 141, a program memory 143 storing a data shaping program which runs on the CPU 142, a main memory 144 for storing and retaining data necessary for the data shaping, an input unit 145 for receiving data, a decoder 146 for decoding shaped data, and a display controller 147 for reproducing and displaying decoded signals. The receiver reproducer 140 initially loads the processing program stored and retained in the program memory 143 onto the CPU 142, thereby initiating the data receiving and reproducing operation. Incidentally, the processing operations of the CPU 142 will be detailed later with reference to FIG. 10.

When the data receiving and reproducing operation is initiated, data input is accepted through the input unit 145. In the main memory 144, the sequence numbers given to the individual layers, or the layered headers of the input data shown in FIG. 3, are monitored for continuity. If discontinuity is detected, the processing for discarding (data shaping) the invalid data is performed as described above. Specifically, the received data is reconstructed into UDP data by each layer, and monitored for completeness as UDP packet data; discard is performed on incomplete data. Data that is complete as UDP data is monitored for the sequence numbers of the individual layers (flow identifier data 0x6-0x1), and checked for continuity. If discontinuous, UDP data including the control code data value of 0xC is discarded until UDP packet data including the control code data value of 0xD, which indicates the top of an image frame, is generated. After the generation of UDP packet data including the control code data value of 0xD, the layered audiovisual data received is decoded by the decoder 146. The decoded data is subjected to display control by the display controller 147. The foregoing is the schematic processing operations of the receiver reproducer.

Figure 10:
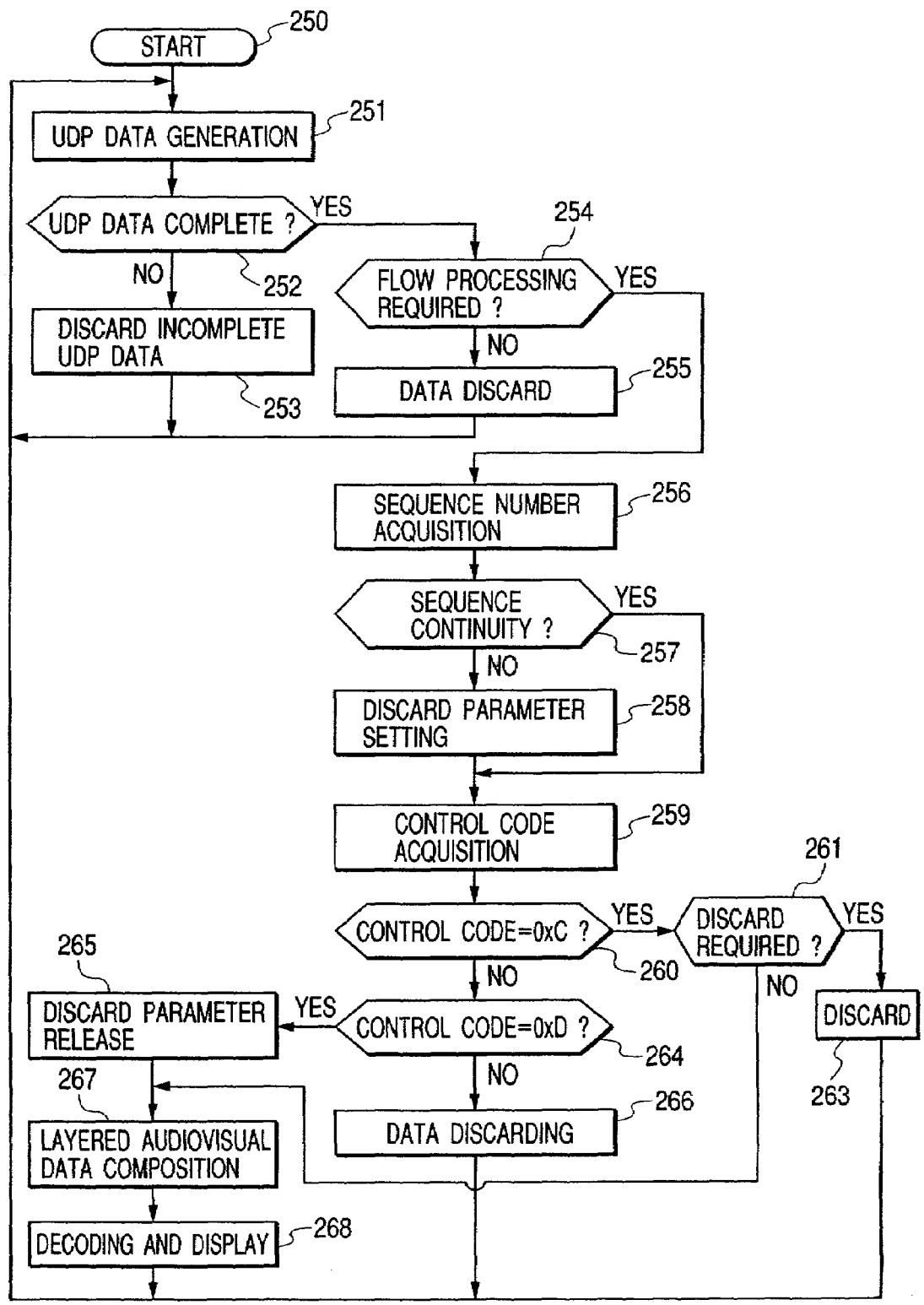
FIG. 10 is a flowchart showing an example of operation of the receiver reproducer according to the present invention.

Next, the processing operations to be made in the CPU 142 of the receiver reproducer will be detailed with reference to FIG. 10. FIG. 10 shows a flowchart of the processing to be performed by the CPU 142 in the receiver reproducer 140.

(1) When the receiver reproducer 140 is turned on, the receiving and reproducing program stored and retained in the program memory 143 is loaded on the CPU 142 to initiate the processing operation for reception and reproduction (step 250).

(2) When the processing operation for reception and reproduction is initiated, UDP data is generated from the IP packet data received from the input unit 145, and checked for completeness as UDP data (step 251, 252).

(3) If the determination at step 252 indicates that part of the UDP data has been discarded and the UDP data is not reconstructible, then the incomplete UDP data is discarded (step 252, 253).

(4) If the UDP data is determined to be reconstructible at step 252, the UDP data is reconstructed, followed by a determination whether it is a processing-requiring flow (e.g., the flow identifier data 0x6-0x1 in the layered header) or not (step 252, 254).

(5) If it is determined not to be a processing-requiring flow at step 254, the data is discarded (step 254, 255).

(6) If the data is determined to be a processing-requiring flow at step 254, then the sequence number in the layered header is acquired to check for continuity in each layer (step 254, 256, 257).

(7) If the determination at step 257 shows discontinuity in the sequence numbers, the flow in the discontinuous layer is set with a discard parameter, followed by the acquisition of the control code data value in the layered header (step 257, 258, 259). In this connection, when the discard parameter has already been set, the discard parameter setting is kept.

(8) If the determination at step 257 indicates continuity in the sequence numbers, then the control code data value in the layered header is acquired (step 257, 259).

(9) After the acquisition of the control code data value, the control code data value is determined if it is intermittent (0xC) of frame layer data (step 260).

(10) If the control code data value is determined to be intermittent (0xC) of layered frame data at step 260, then a determination is made as to whether it is discard-requiring data or not (step 260, 261).

(11) If it is determined not to be a processing-requiring flow at step 261, the composition of layered audiovisual data is performed (step 261, 267).

(12) If it is determined to be discard-requiring data at step 261, the data is discarded and the generation of next UDP data is initiated (step 261, 263, 251).

(13) If the control code data value is determined not to be intermittent (0xC) of layered frame data at step 260, then a determination is made as to whether the control code data value is the top (0xD) of layered frame data or not (step 260, 264).

(14) If the control code data value is determined not to be the top (0xD) of layered frame data at step 264, the data is discarded and the generation of next UDP data is initiated (step 264, 266, 251).

(15) If the control code data value is determined to be the top (0xD) of layered frame data at step 264, the discarding of the corresponding layered frame data is terminated and the composition of layered audiovisual data is performed (step 264). In this connection, if the discard parameter has not been set, the composition of the layered audiovisual data is continued.

(16) After the composition of the layered audiovisual data, the layered audiovisual data is decoded by the decoder 146. The decoded data is subjected to display control by the display controller 147.

The foregoing is the processing flow to be performed by the CPU 142 in the receiver reproducer.

Figure 11:
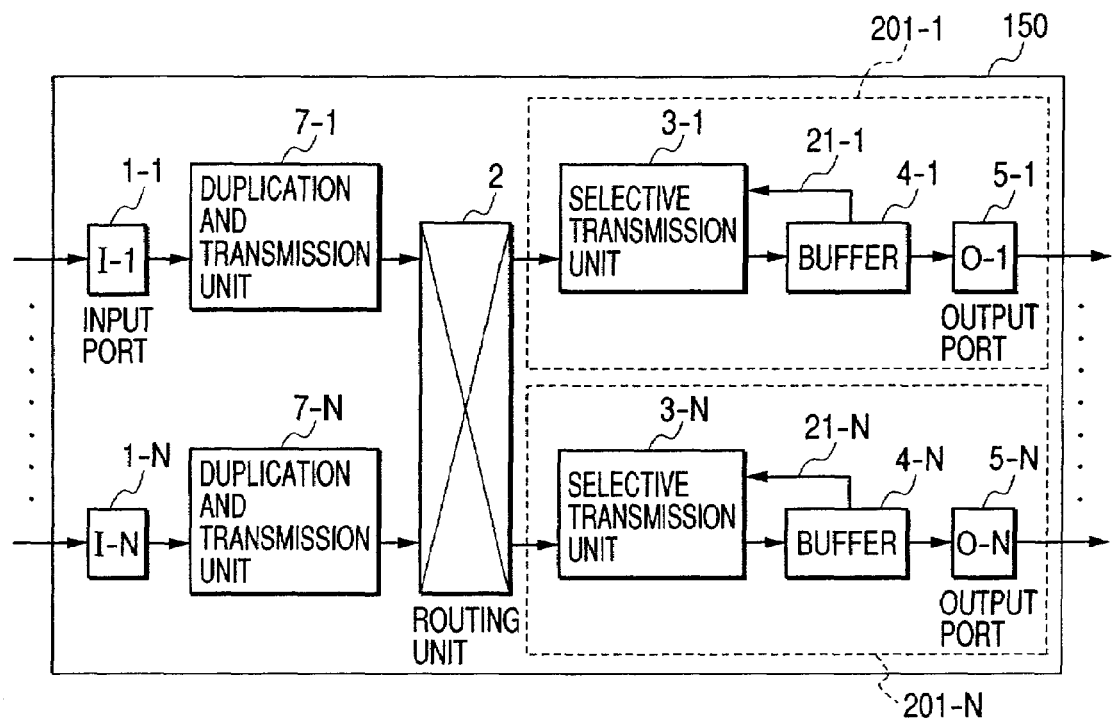
FIG. 11 is a block diagram showing another example of the packet data transfer apparatus according to the present invention.

FIG. 11 shows a modified example 150 of the packet data transfer apparatus 100 shown in FIG. 1. The packet data transfer has dealt with the operation in which whether or not the amounts of data in the buffers 4 reach or exceed predetermined data amounts (the points of amounts of in-buffer data at which packet data discard should be initiated or terminated) is monitored (signals 21) so that the selective transmission units 3 select either transmission or discard of packet data. On the other hand, the packet data transfer apparatus 150 of the present embodiment deals with a method of duplicating data in data multicast distribution, along with the above-described operations of selectively transmitting and discarding packet data.

The packet data transfer apparatus 150 shown in FIG. 11 basically has the same configuration as that of the packet data transfer apparatus 100 in FIG. 1. A difference consists in that duplication and transmission units 7 (7-1 to 7-N) for generating multicast-intended data are arranged between the input ports 1 (1—1 to 1-N) for establishing connection with a plurality of input lines and the routing unit 2 for routing packet data. Hereinafter, the operation of the packet data transfer apparatus 150 will be described with particular emphasis on the operational differences from the packet data transfer apparatus 100 in FIG. 1. The transfer apparatus 150 initially receives IP packet data shown in FIG. 3, such as the IP packet data consisting of the data 48, 46, 42, and 43-1, through a plurality of input ports 1 (1—1 to 1-N). The IP packet data received through the plurality of input ports is transmitted to the respective duplication and transmission units 7 (7-1 to 7-N), where packet data duplication is performed if necessary. Then, the data is routed via the routing unit 2 to predetermined output ports (here, any of the selective transmission units 3-1 to 3-N) depending on the destination addresses of the IP packet headers. The processing operations after the routing are identical to those of the packet data transfer apparatus 100 in FIG. 1; therefore, description will hereinafter be given of the detailed configuration and operation of the duplication and transmission units 7 with reference to FIG. 12.

Figure 12:
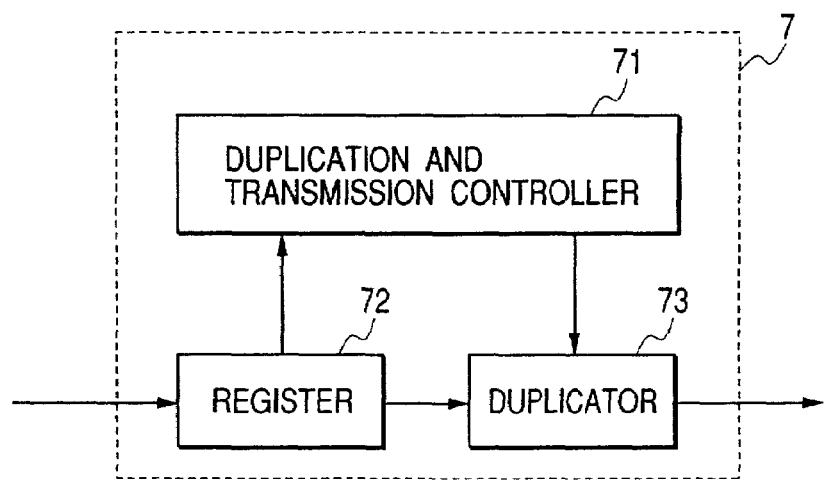
FIG. 12 is a block diagram of a duplication and transmission unit in the packet data transfer apparatus shown in FIG. 11.

FIG. 12 is a diagram showing the detailed configuration of a selective transmission unit 7. A selective transmission unit 7 comprises a duplication and transmission controller 71, a register 72 for retaining data temporarily, and a duplicator 73 for creating a duplication of data. IP packet data received from the input port 1 is temporarily retained in the register 72 so that the duplication and transmission controller 71 analyzer, the DS value in the IP header. The duplication and transmission controller 71 previously stores and retains the flow identifier data, duplication initiating control code data, and duplication—terminating control code data of the IP packet data to create a duplication of in multicast distribution. Here, description will be given below with the assumption that the flow to duplicate is the I—frame higher spatial frequency component (flow identifier data 0x5). The creation of a packet data duplication is initiated at packet data including the control code data of 0xD. Flows under the duplication creation and distribution are flagged as being duplicated, and the flag is stored and retained in the duplication and transmission controller 71. When the creation of the duplication is no longer required, the creation of the duplication is terminated at packet data including the control code data of 0xD. That is, in initiating to create a duplication, the duplication creation is hold back an long as packet data including the DS value of 0x5C is received. The duplication creation is initiated after the reception of IP packet data with 0x5D. The duplication and transmission controller 71 also controls the duplicator 73 so that when the duplicating—creating flag is set on and the creation of the duplication is no longer required, the duplication creation is not terminated as long as packet data including the DS value of 0x5C is received, and that the duplication creation is terminated after the reception of IP packet data with 0x5D. The foregoing are the configuration and operation of the selective transmission unit 7.

Figure 13:
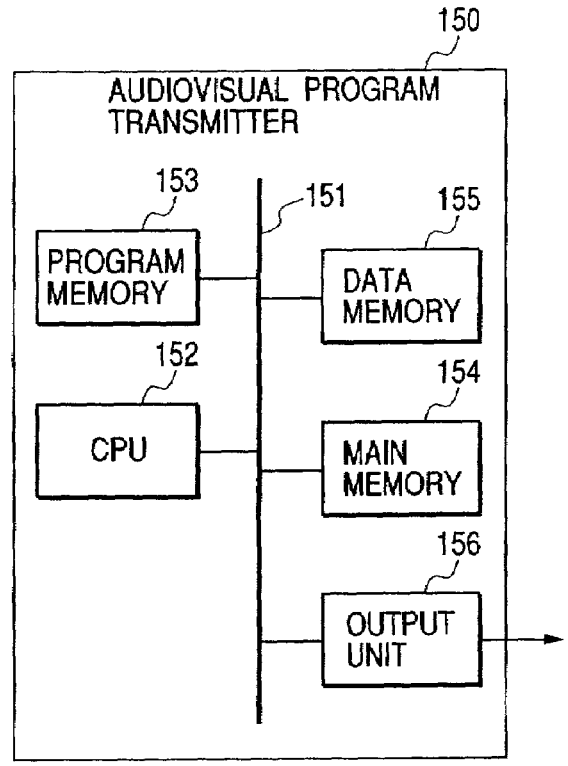
FIG. 13 is a diagram showing a configuration example of the audiovisual data distribution apparatus according to the present invention.

FIG. 13 is a diagram showing the configuration of an apparatus for distributing the layered audiovisual data shown in FIG. 3. The audiovisual distribution apparatus 150 shown in FIG. 13 comprises a CPU 152 connected with a bus 151, a program memory 153 storing an audiovisual distribution program which runs on the CPU 152, a main memory 154 for storing and retaining data which is necessary during the audiovisual distribution processing, a data memory 155 for storing and retaining layered audiovisual data, and an output unit 156 for distributing data in the form of packet data.

The audiovisual distribution apparatus 150 initially loads the processing program stored and retained in the program memory 153 onto the CPU 152, thereby initiating the packet data distributing operation.

Incidentally, the distributing operation of the CPU 152 will be detailed later with reference to FIG. 14.

When the operation of distributing layered audiovisual data is initiated, the layered audiovisual data stored and retained in the data memory 155 is read into the main memory 154, and partitioned into predetermined sized by each layer. The layered headers described in FIG. 3 are attached to the individual pieces of partitioned data to generate layered packet data. Moreover, UDP headers are added to the layered-packetized data to generate UDP packet data, and then converted into IP packet data for distribution from the output unit 156.

Figure 14:
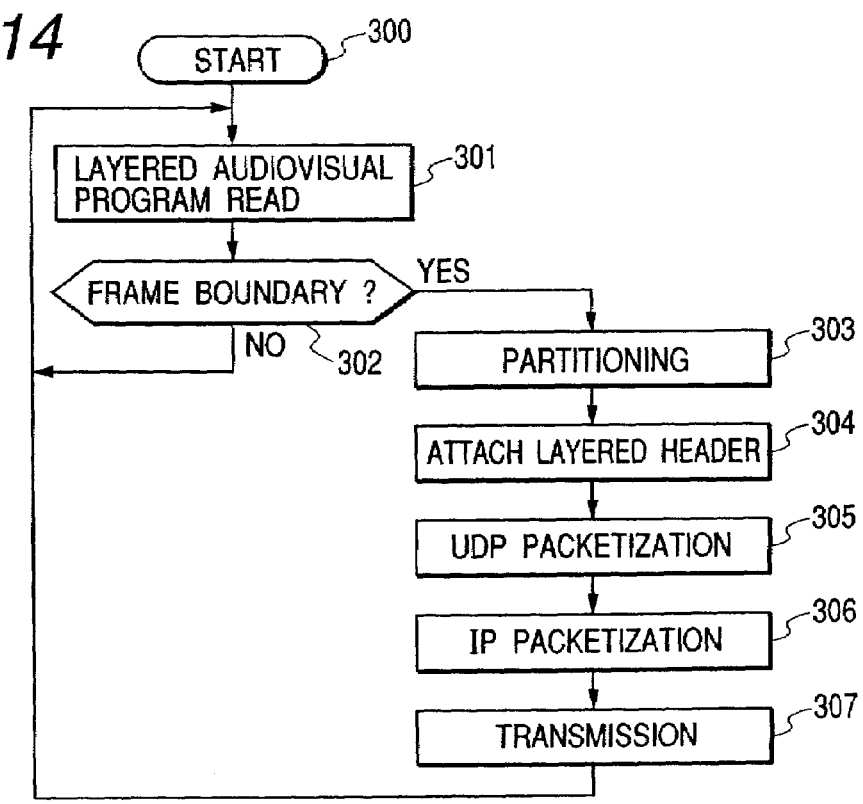
FIG. 14 is a flowchart showing an example of operation of the audiovisual data distribution apparatus according to the present invention.

FIG. 14 shows a flowchart of the distribution operations to be performed by the CPU 152 in the audiovisual distribution apparatus 150.

(1) When the audiovisual distribution apparatus 150 is turned on, the audiovisual distribution program stored and retained in the program memory 153 is loaded on the CPU 152 to initiate the layered data distributing operation (step 300).

(2) When the layered data distribution operation is initiated, layered audiovisual data is read out from the data memory 155 which stores layered data. A determination is made as to whether or not the layered audiovisual data is read up to a frame boundary (step 301, 302).

(3) If the determination at step 302 shows that the frame boundary is yet to be read, the CPU 152 returns to step 301 to read data again (step 302, 301).

(4) If the determination at step 302 indicates that the frame boundary is read, the read data is partitioned by predetermined size, e.g., 4 Kbytes (step 302, 303).

(5) After the predetermined-size partitioning, layered headers described in FIG. 3 are attached to the individual pieces of layered data (step 304).

(6) UDP headers are added to the layered-header-added layered packet data to constitute UDP packet data (step 305).

(7) The UDP packet data is divided into divided data, to which IP headers described in FIG. 3 are added to constitute IP packet data (step 306).

(8) The IP-packetized data is distributed from the output unit 156 (step 307).

The foregoing is the audiovisual distribution flow to be performed by the CPU 152 in the audiovisual distribution apparatus 150. While the present embodiment has been described in conjunction with the distribution of layered data using MPEG-1/2 coding as shown in FIG. 3, MPEG-4 coding may be used as the coding scheme. The MPEG-4 coding is an object-by-object coding. Therefore, when flow identifier data and control code data are added to each object for IP packet distribution, the selective data transmission/discard and duplication transmission performed under the MPEG-1/2 become possible.

Figure 15:
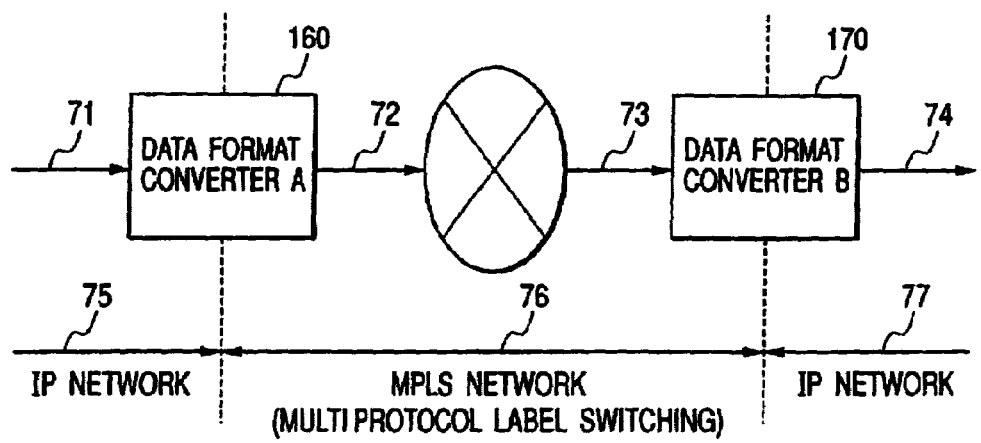
FIG. 15 is a diagram explaining an interconnected transmission network of IP networks and an MPLS network.

FIG. 15 shows a configuration in which IP packet data is converted into MPLS (multiprotocol label switching) packet data, and the converted MPLS packet data is transmitted through an MIIPLS network and then reconverted into IP packet data for transmission. In FIG. 15, the areas 75 and 77 represent IP networks, and the area 76 an MIPLS network. In the interconnected network of the IP networks and the MPLS network shown in FIG. 15, IP packet data 71 is converted into MPLS packet data 72 by a data format converter A, or 160, and transmitted through the MPLS network 76. Besides, MLS packet data 73 is converted into IP packet data 74 by a data format converter B, or 170, and transmitted through the IP network 77.

Figure 16:
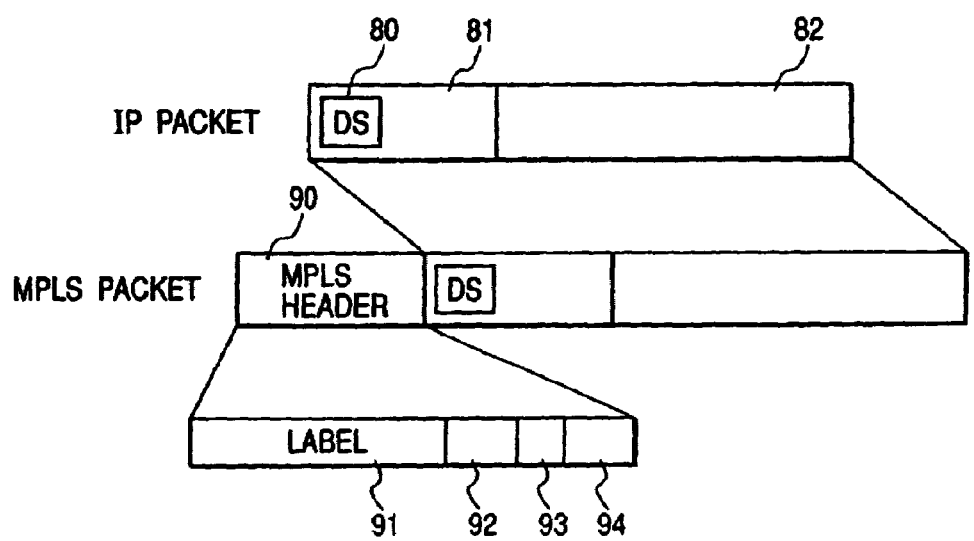
FIG. 16 is a diagram showing an example of correspondence between IP packet data and MPLS packet data according to the present invention.

FIG. 16 shows the correspondences between IP packet data and MPLS packet data, employed in transmitting transmission data through the interconnected network of the IP networks and the MPLS network described in FIG. 15. Incidentally, the conversion method of IP packet data and MPLS packet data will be described later with reference to FIGS. 18–21. Hereinafter, description will be given with the assumption that the MPEG-1/2 data described in FIG. 3 is the IP packet data 82.

When IP packet data transmits the MPEG-1/2 data mentioned above, the values shown in FIG. 4 can be used as the DS value 80 in an IP packet header 81. The IP packet data configured thus (consisting of the data 81 and 82) can be converted into MPLS packet data by adding an MPLS header 90 (32 bits) to each piece of the IP packet data. The MPLS header 90, as shown in the diagram, comprises a label 91 (20 bits) for identifying data, a testing field 92 (3 bits), a stack field 93 (1 bit) for indicating the stack termination, and a TTL (Time To Live) 94 (8 bits). Here, available values include: a fixed value 7 (111 in binary) for the testing field 92; 0 (0 in binary) and 1 (1 in binary) for the stack field 93 when at the top and at the termination of transmission data, respectively; an 15 (00001111 in binary) for the TTL 94. As for the value of the label 91, a 12-bit conversion pad (111111111111 in binary) can be added to the higher bit of the DS values in the IP packet header, as shown in FIG. 17, to generate the label value for MPLS packet data from the DS value with facility.

Figure 18:
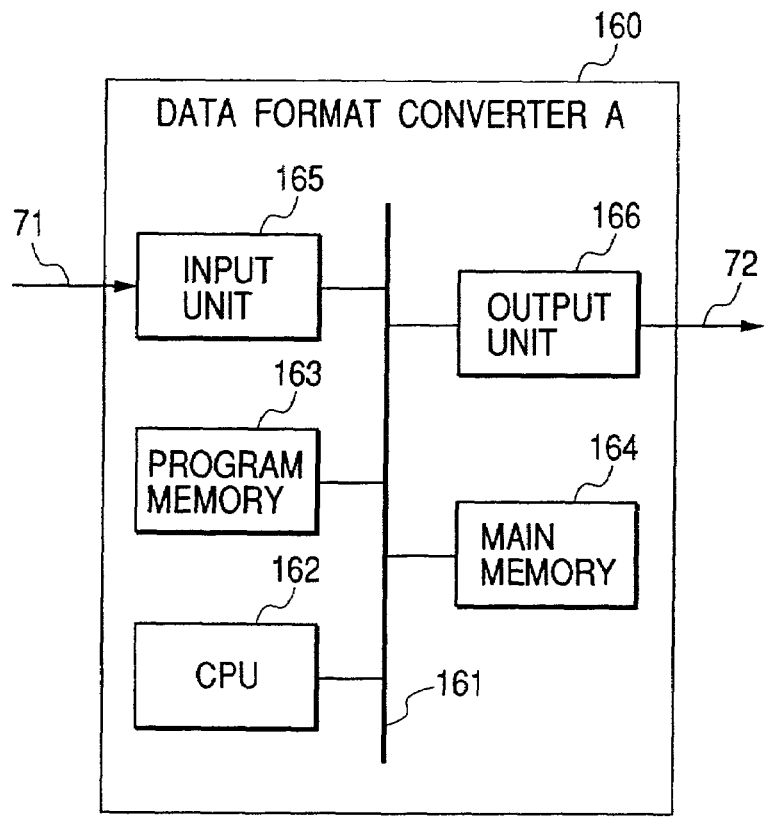
FIG. 18 is a diagram showing a configuration example of the data format converter according to the present invention.
Figure 19:
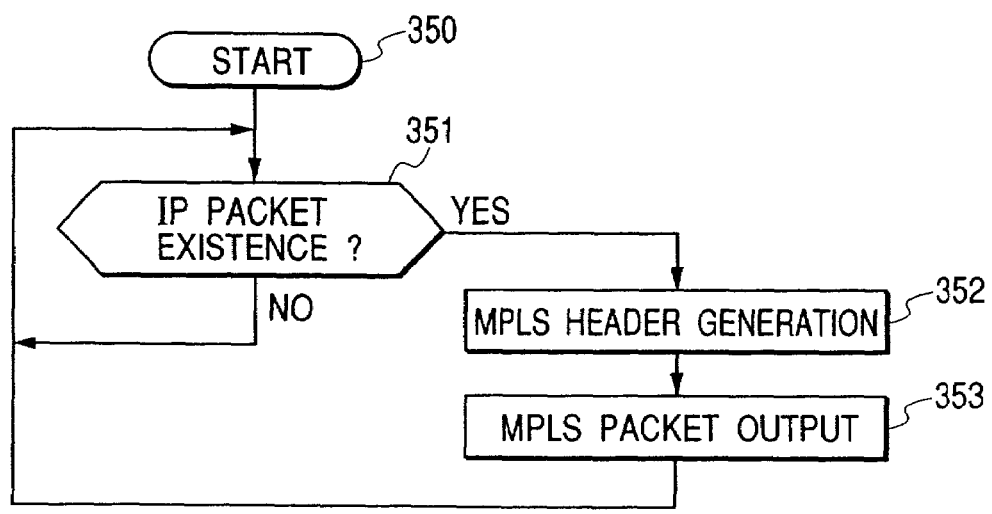
FIG. 19 is a flowchart showing an example of operation of the data format converter shown in FIG. 18.

FIG. 18 shows the configuration of the data format converter A which converts the IP packet data 71 into the MPLS packet data 72. FIG. 19 shows a flowchart of the data format conversion program to be executed by a CPU 162 of the data format converter A in FIG. 18.

The data format converter A, or 160, shown in FIG. 18 comprises the CPU 162 which is connected with a bus 161, a program memory 163 for storing a data format conversion program which runs on the CPU 162, a main memory 164 for storing and retaining data required during the data format conversion processing, an input unit 165 for receiving IP packet data, and an output unit 166 for outputting MPLS packet data. The data format converter A, or 160, initially loads the processing program stored and retained in the program memory 163 onto the CPU 162, thereby initiating the data format conversion processing operation. Incidentally, the distributing operation of the CPU 162 will be detailed later with reference to FIG. 19. When the data format conversion processing operation is initiated, the IP packet data 71 is received through the input unit 165, and temporarily stored and retained in the main memory 164. An MPLS header is generated with reference to the DS value contained in the header of the IP packet data received. The generated MPLS header is added to the top of the IP packet data to generate MPLS packet data, so that the MPLS packet data 72 is output from the output unit 166.

FIG. 19 shows a flowchart of the data format conversion processing operation to be performed by the CPU 162 of the data format converter A, or 160.

(1) When the data format converter A is turned on, the data format conversion processing program stored and retained in the program memory 163 is loaded on the CPU 162 to initiate the data format conversion processing operation (step 350, 351).

(2) When the data format conversion processing operation is initiated, the reception of IP packet data through the input unit 165 is initiated, followed by a determination as to whether or not any IP packet data is received (step 351).

(3) If the determination at step 351 shows that no IP packet data is received, the waiting operation for the reception of IP packet data is continued (step 351).

(4) If the determination at step 351 finds the reception of IP packet data, an MPLS packet header described in FIGS. 16 and 17 is generated from the DS value in the IP packet header (step 352).

(5) After the generation of the MPLS packet header, the MPLS packet header is added to the top of the IP packet data, followed by the output of the MPLS packet data from the output unit 166 (step 353). The foregoing is the data format conversion processing operations to be performed by the CPU 162 in the data format converter A, or 160.

Figure 20:
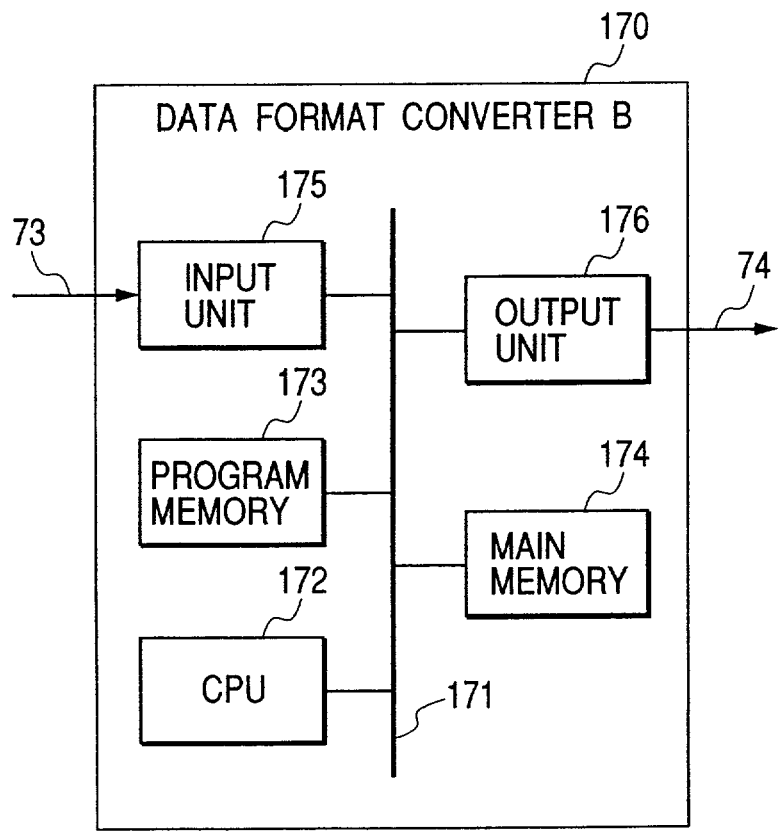
FIG. 20 is a diagram showing another configuration example of the data format converter according to the present invention.
Figure 21:
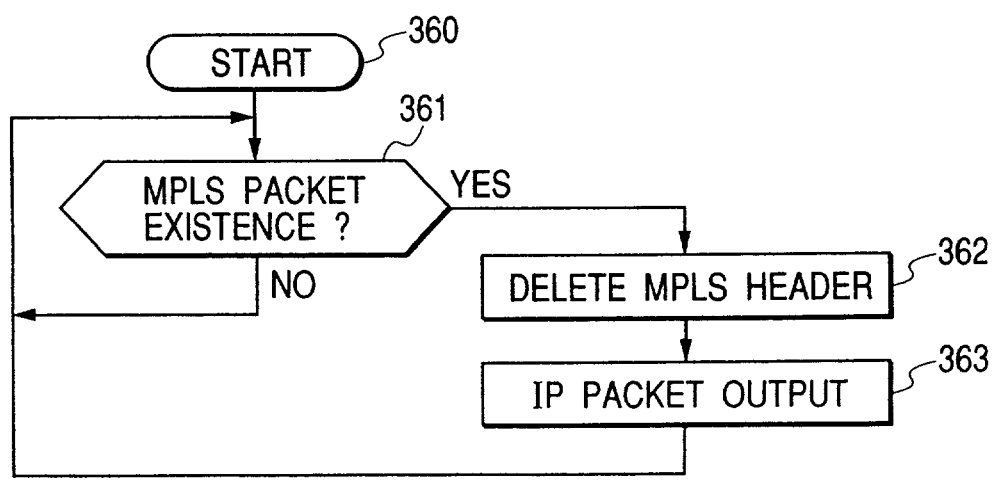
FIG. 21 is a flowchart showing an example of operation of the another example of the data format converter shown in FIG. 20.

FIG. 20 shows the configuration of the data format converter B which converts the MPLS packet data 73 into the IP packet data 74. FIG. 21 shows a flowchart of the data format conversion program to be executed by a CPU 172 of the data format converter B in FIG. 20.

The data format converter B 170 shown in FIG. 20 comprises the CPU 172 which is connected with a bus 171, a program memory 173 for storing a data format conversion program which runs on the CPU 172, a main memory 174 for storing and retaining data required during the data format conversion processing, an input unit 175 for receiving MPLS packet data, and an output unit 176 for outputting IP packet data. The data format converter B, or 170, initially loads the processing program stored and retained in the program memory 173 onto the CPU 172, thereby initiating the data format conversion processing operation. Incidentally, the distributing operation of the CPU 172 will be detailed later with reference to FIG. 21. When the data format conversion processing operation is initiated, the MPLS packet data 73 is received through the input unit 175, and temporarily stored and retained in the main memory 174. The header data is deleted from the received MPLS packet data to generate IP packet data, so that the IP packet data 74 is output from the output unit 176.

FIG. 21 shows a flowchart of the data format conversion processing operation to be performed by the CPU 162 in the data format converter B, or 170.

(1) When the data format converter B is turned on, the data format conversion processing program stored and retained in the program memory 173 is loaded on the CPU 172 to initiate the data format conversion processing operation (step 360, 361).

(2) When the data format conversion processing operation is initiated, the reception of MPLS packet data through the input unit 175 is initiated, followed by a determination as to whether or not any MPLS packet data is received (step 361).

(3) If the determination at step 361 indicates that no MPLS packet data is received, the waiting operation for the reception of MPLS packet data is continued (step 361).

(4) If the determination at step 361 finds the reception of MPLS packet data, the header data is deleted from the MPLS packet data to generate IP packet data (step 362).

(5) After the generation of the IP packet header, the IP packet header is output from the output unit 176 (step 363). The foregoing is the data format conversion processing operations to be performed by the CPU 172 in the data format converter B, or 170.

Figure 22:
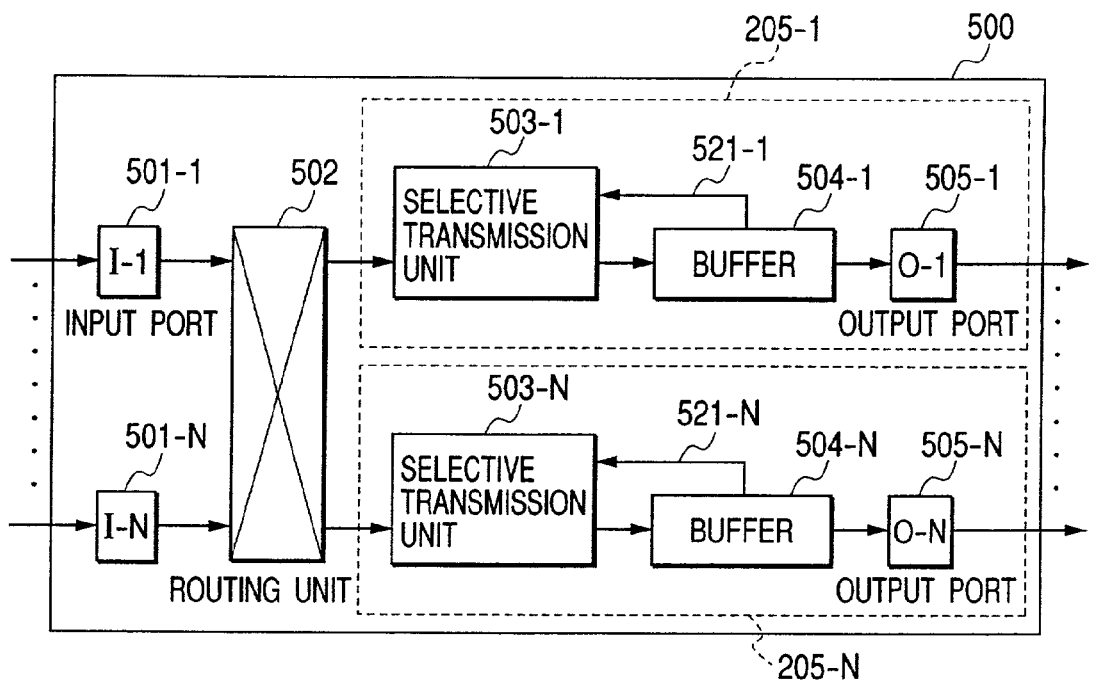
FIG. 22 is a block diagram showing another example of the packet data transfer apparatus according to the present invention.

FIG. 22 is a diagram showing the configuration of an MPLS packet data transfer apparatus 500 according to an embodiment of the present invention. Specifically, the MPLS packet data transfer apparatus 500 comprises input ports 501 (501-1 to 501-N) for establishing connection with a plurality of input lines, a routing unit 502 for routing MPLS packet data, selective transmission units 503 (503-1 to 503-N) for selectively transmitting data that are routed for a plurality of output lines, buffers 504 (504-1 to 504-N) connected to the respective selective transmission units, and output ports 505 (505-1 to 505-N) for establishing connection with the plurality of output lines. The input ports 501 (501-1 to 501-N) may be made out of ingress cards. The selective transmission units 503 (503-1 to 503-N), the buffers 504 (504-1 to 504-N) connected to the respective selective transmission units, and the output ports 505 (505-1 to 505-N) for establishing connection with the plurality of output ports may be formed as egress cards 205 (205-1 to 205-N).

The MPLS packet data transfer apparatus 500 initially receives MPLS packet data shown in FIG. 16, such as data having the label values shown in FIG. 17, through the plurality of input ports 501 (501-1 to 501-N). The MPLS packet data received is routed through the routing unit 502 to predetermined output ports (here, any of the selective transmission units 503-1 to 503-N) depending on the label value. The MPLS packet data transferred to the selective transmission units 503 (503-1 to 503-N) are subjected to a determination as to whether or not to be transmitted from the selective transmission units 503 (3-1 to 3-N) to the buffers 504 (504-1 to 504-N) connected at the subsequent stage, based on data amount signals 521 (521-1 to 521-N) from the buffers.

The MPLS packet data transfer apparatus 500 in FIG. 22 exemplifies the case of monitoring if the amounts of data in the buffers 504 (504-1 to 504-N) reach/exceed a predetermined data amount (the point of in-buffer data amount at which packet data discard should be initiated or terminated). Here, whether or not the amounts of data in the buffers 504 (504-1 to 504-N) reach/exceed the predetermined amount is notified to the selective transmission units 503 (503-1 to 503-N) by the signals 521 (521-1 to 521-N). Thereby, whether or not the MPLS packet data should be transmitted from the selective transmission units 503 (503-1 to 503-N) to the buffers 504 (504-1 to 504-N) is determined. In the cases of transmission, the MPLS packet data are transmitted from the selective transmission units 503 (503-1 to 503-N) to the buffers 504 (504-1 to 504-N). In the cases of no transmission (or discard), the MPLS packet data are not transmitted from the selective transmission units 503 (503-1 to 503-N) to the buffers 504 (504-1 to 504-N), and are discarded within the selective transmission units 503 (503-1 to 503-N). Incidentally, the operation of the selective transmission units 503 (503-1 to 503-N) will be described later with reference to FIG. 23. The MPLS packet data transmitted into the buffers 504 (504-1 to 504-N) are distributed to the output lines from the output ports 505 (505-1 to 505-N).

Figure 23:
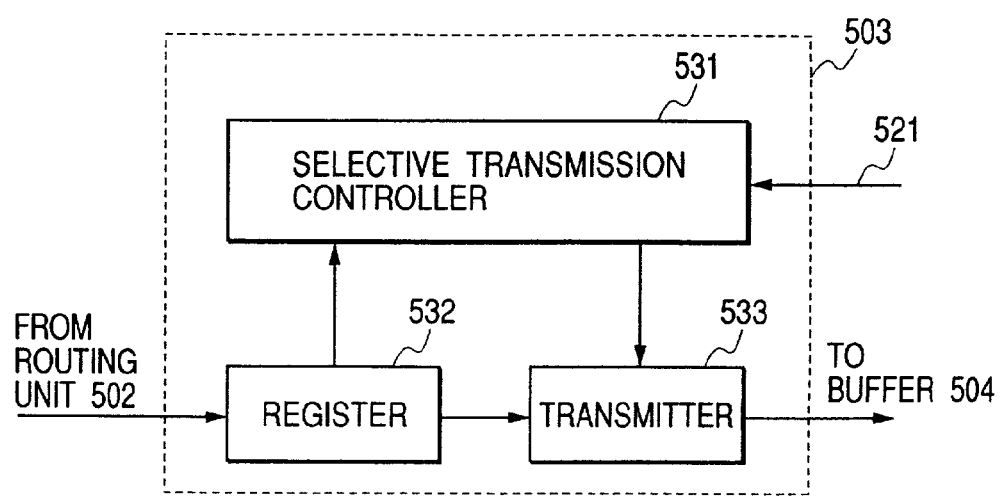
FIG. 23 is a block diagram of a selective transfer unit in the another example of the packet data transfer apparatus shown in FIG. 22.

FIG. 23 is a diagram showing the detailed configuration of a selective transmission unit 503. A selective transmission unit 503 comprises a selective transmission controller 531, a register 532 for retaining data temporarily, and a transmitter 533 for executing data transmission. MPLS packet data routed by the routing unit 502 is temporarily retained in the register 532. The selective transmission controller 31 analyzes the DS value in the MPLS header. The selective transmission controller 531 previously stores and retains the label value of MPLS packet data to be discarded when the amount of data in the buffer 504 reaches/exceeds a predetermined amount (under congestion).

Here, description will be given with the assumption that the flow to be discarded upon the congestion of the buffer 504 is the B-frame higher spatial frequency component (the flow identifier data in the label is 0x1). Besides, the MPLS packet discard is initiated at MPLS packet data including the control code data of 0xD in the label. Flows under discard are flagged as being discarded, and the flag is stored and retained in the selective transmission controller 531. When the discard flag is on and the congestion of the buffer 504 is resolved, the transmission to the buffer 504 is initiated from packet data including the control code data of 0xD in the label. That is, when the buffer 504 is congested, discard is held back as long as MPLS packet data including a label value of 0xFFF1C is received. The discard is initiated after the reception of MPLS packet data that has a label value of 0xFFF1D. The selective transmission controller 531 also controls the transmitter 533 so that when the discard flag is on and the congestion of the buffer 504 is resolved, the discard is not terminated as long as packet data including the label value of 0xFFF1C is received, and the discard is terminated after the reception of MPLS packet data with 0xFFF1D. Under the control of the selective transmission controller 531, the transmitter 533 performs either operation, transmitting the MPLS packet data read from the register 532 to the buffer 504 or discarding the same.

The foregoing are the configuration and operation of the selective transmission unit 503. Incidentally, in the selective transmission and discard described with reference to FIGS. 22 and 23, only a single discard initiation/termination point is established on the amount of data in a buffer so that the transmission and discard are selectively performed on a single layer alone. However, two or more discard initiation/termination points may be provided so that selective transmission and discard are performed for two or more layers. Moreover, depending on the amount of data in a buffer, discard initiation and termination points may be separately established to perform transmission and discard selectively. The foregoing are the configuration and processing operation of the MPLS packet data transfer apparatus 500 shown in FIGS. 22 and 23.

The selective packet transfer/discard method having been described above, wherein data flows with predetermined identifiers under transmission network congestion initiation to be discarded at packet data including predetermined control code data and finish being discarded at packet data including predetermined control code data, is also feasible with ATM (Asynchronous Transfer Mode) networks and/or IPv6 (Internet Protocol Version 6) networks.

On an ATM network, the data transmission is performed in 53-byte ATM cells. A 53-byte ATM cell is composed of a 5-byte ATM cell header and 48-byte data. The 5-byte cell header includes a VPI (Virtual Path Identifier) and a VCI (Virtual Channel Identifier), or fields for flow identification, along with a PT (Payload Type) which shows the data type. Thereby, predetermined identifiers can be VPI- and VCI-mapped, or the PT can be used as a predetermined identifier to realize the selective transmission/discard. Specifically, each layer of data that comprises a plurality of layers is mapped to the VPI and VCI. The ATM-PT for transmitting the leading data of an MPEG data frame, for example, is set at a value different from that of the PT for transmitting intermittent data of the frame. When congestion occurs in an ATM exchange, discard is initiated at an ATM cell having the PT for transmitting the leading data of the abovementioned image frame. After the discard is initiated, the discard is terminated at another ATM cell having the PT for transmitting the leading data of the above-mentioned image frame. This can achieve the selective packet transmission/discard function realized on IP networks or MPLS networks.

IPv6 networks are the next generation of the abovementioned IP (more precisely, IPv4) networks. The fundamental IPv6 header has a 3-byte flow label field; therefore, a 2-byte conversion pad (such as 0xFFFF) can be added to the top of the 1-byte DS field value used in the IPv4 networks, to easily bring the DS field and the flow label into correspondence with each other. Thereby, the selective packet transmission/discard function mentioned above can be realized.

As has been described above, according to the present invention, meaningful data structures such as image frames and slices are divided for IP packet transmission, and when packet discard is required due to transmission network congestion, the packet discard is initiated/terminated in accordance with the beginning of meaningful data (image frame or slice) rather than in the middle of the meaningful data. Thus, there can be provided a data transfer method and transfer system which make effective use of transmission channel bandwidths.

Moreover, according to the present invention, packet duplication at the time of data multicast distribution is initiated in accordance with the beginning of meaningful data such as image frames and slices rather than the duplication being initiated in the middle of the meaningful data. Thus, there can be provided a data transfer method and transfer apparatus which make effective use of transmission channel bandwidths.

Furthermore, according to the present invention, when audiovisual data consisting of a plurality of streams is transmitted, the discard of low priority packet data is performed in packet groups belonging to the low priority layer. Thus, there can be provided a data transfer method and transfer apparatus which prevent uneven replay at the receiver reproducer side.

What is claimed is:

1. A packet data transfer method for an IP (Internet Protocol) network or an MPLS (Multi-Protocol Label Switching) network, comprising the steps of:
    retaining flow identifier data for identifying data to be processed and control code identifier data for controlling the processing for each of a plurality sets of packet data, in a packet data transfer apparatus having a plurality of Input and Output ports;
    receiving the plurality of sets of packet data transmitted via respective data packets converted from a meaningful frame or slice of audiovisual data, said data packets provided with said flow identifier data and said control code identifier data; and
    in discarding packet data identified by the flow identifier data upon congestion in the packet data transfer apparatus, performing discard initiation or termination based on said control code identifier data,
    wherein the discard is initiated at an initial data packet of the meaningful frame or slice of audiovisual data rather than at a middle data packet of the meaningful frame or slice of audiovisual data.

2. The packet data transfer method according to claim 1, wherein the discard initiation and discard termination of the packet data identified as packet data to be processed are conducted at packet data including predetermined control code identifier data.

3. The packet data transfer method according to claim 1, wherein the discard initiation and discard termination of the packet data identified as packet data to be processed are conducted at packet data that follows packet data including predetermined control code identifier data.

4. The packet data transfer method according to claim 1, wherein when said flow identifier data indicates image data, said control code identifier data is generated from any of a sequence initiation code, a GOP (Group Of Pictures) initiation code, a picture (image frame) initiation code, and a slice initiation code included in the image data.

5. The packet data transfer method according to claim 1, wherein:
    a buffer data amount at the output stage of the packet data transfer apparatus is monitored as to whether or not it is greater than or equal to a predetermined amount (hereinafter, referred to as "discard initiation or termination point");

if said buffer data amount increases to reach or exceed the discard initiation or termination point, and packet data including predetermined control code identifier data and flow identifier data is received, then the discard of packet data including that flow identifier data is initiated; and if said buffer data amount decreases to fall below the discard initiation or termination point, and packet data including predetermined control code identifier data and flow identifier data is received, then the discard of packet data including that flow identifier data is terminated.

6. The packet data transfer method according to claim 5, wherein:

a plurality of discard initiation or termination points are established in association with different flow identifier data each;

said buffer data amount is monitored as to whether or not it is greater than or equal to the plurality of discard initiation or termination points established;

if said buffer data amount increases to reach or exceed any of the discard initiation or termination points, and packet data including predetermined control code identifier data and the flow identifier data associated with that discard initiation or termination point is received, then the discard of packet data including that flow identifier data is initiated; and if said buffer data amount decreases to fall below any of the discard initiation or termination points, and packet data including predetermined control code identifier data and the flow identifier data associated with that discard initiation or termination point is received, then the discard of packet data including that flow identifier data is terminated.

7. The packet data transfer method according to claim 1, wherein:

a buffer data amount at the output stage of the packet data transfer apparatus is monitored as to whether or not it is greater than or equal to a discard initiation point which discards a first predetermined amount, and whether or not it is greater than or equal to a discard termination point which discards a second predetermined amount which is less than said first predetermined amount;

if said buffer data amount increases to reach or exceed the discard initiation point, and packet data including predetermined control code identifier data and flow identifier data is received, then the discard of packet data including that flow identifier data is initiated; and if said buffer data amount decreases to fall below the discard termination point, and packet data including predetermined control code identifier data and flow identifier data is received, then the discard of packet data including that flow identifier data is terminated.

8. The packet data transfer method according to claim 7, wherein:

a plurality of discard initiation points and discard termination points are established in association with different flow identifier data each;

said buffer data amount is monitored as to whether or not it is greater than or equal to the plurality of discard initiation points established, and whether or not it is greater than or equal to the plurality of discard termination points established;

if said buffer data amount increases to reach or exceed any of the discard initiation points, and packet data including predetermined control data and the flow identifier data associated with that discard initiation point is received, then the discard of packet data including that flow identifier data is initiated; and if said buffer data amount decreases to fall below any of the discard termination points, and packet data including predetermined control code identifier data and the flow identifier data associated with that discard termination point is received, then the discard of packet data including that flow identifier data is terminated.

9. A packet data transfer method for transferring a plurality sets of packet data transmitted via respective data packets converted from a meaningful frame or slice of audiovisual data, by using a router comprising a plurality of ingress cards each for establishing connection with an input line, a plurality of egress cards each having a data discard function and a buffer, for establishing connection with an output line, and a switch connected to said plurality of ingress cards and said plurality of egress cards, said packet data being a plurality of pieces of packet data into which layered coded image frame data is packetized by layer, having a header including a field to be set with destination address information, a field to be set with flow identifier data for identifying each layer, and a field to be set with control code data for initiation or termination discard, comprising:

transferring the packet data input to said ingress cards to said switch so that the packet data is transferred to egress cards corresponding to the value of its address field;

if the amount of packet data residing in any of said buffers exceeds a predetermined threshold value, discarding the packet data to be input to that buffer by layer, based on said control code data and depending on said flow identifier data, and initiating the discard is initiated at an initial data packet of the meaningful frame or slice of audiovisual data rather than at a middle data packet of the meaningful frame or slice of audiovisual data.

10. A packet data transfer apparatus comprising:

a plurality of ingress cards each for establishing connection with an input line;

a plurality of egress cards each having a data discarding function and a buffer, for establishing connection with an output line;

a switch connected to said plurality of ingress cards and said plurality of egress cards; and means for discarding, where a plurality sets of packet data transmitted via respective data packets converted from a meaningful frame or slice of audiovisual data is input to said ingress cards and then transferred to said switch so that the packet data is transferred to egress cards corresponding to the value of its address field, said packet data includes a plurality of pieces of data into which layered coded image frame data is packetized by layer, having a header including a field to be set with destination address information, a field to be set with flow identifier data for identifying each layer, and a field to be set with control code data for initiation or termination discard, and said means for discarding , when the amount of packet data residing in any of said buffers exceeds a predetermined threshold value, discards the packet data to be input to that buffer by layer based on said control code data and depending on said flow identifier data, wherein the discard is initiated at an initial data packet of the meaningful frame or slice of audiovisual data rather than at a middle data packet of the meaningful frame or slice of audiovisual data.

11. A data distribution scheme on an MPLS network, for distributing transmission data with flow identifier data for identifying said transmission data and control code data for controlling the discard initiation or termination of said transmission data in the middle of transmission arranged in a label field in the MPLS packet header thereof, wherein a plurality of sets of packet data transmitted via respective data packets are received, said data packets are converted from a meaningful frame or slice of audiovisual data, said data packets, and the discard is initiated at an initial data packet of the meaningful frame or slice of audiovisual data rather than at a middle data packet of the meaningful frame or slice of audiovisual data.

12. A packet data generating method for generating packet data from layered data consisting of a plurality of streams, comprising:

receiving a plurality of sets of the packet data transmitted via respective data packets, said data packets being converted from a meaningful frame or slice of audiovisual data, adding into said data packets flow identifier data for identifying each layered data to be transmitted and control code data for initiating or terminating a discard operation when congestion occurs during transmission are added to each piece of said layered data partitioned by predetermined size, to form layered packet data; and adding into said data packets UDP (User Datagram Protocol) headers for UDP packetization, wherein the discard is initiated at an initial data packet of the meaningful frame or slice of audiovisual data rather than at a middle data packet of the meaningful frame or slice of audiovisual data.

13. A data shaping method comprising the steps of:

receiving a data flow of a plurality of sets of the packet data transmitted via respective data packets, said data packets being converted from a meaningful frame or slice of audiovisual data, said data flow being distributed after created in such a manner that flow identifier data for identifying each layered data in layered data consisting of a plurality of streams, a sequence number to be consecutively given to data partitioned by predetermined size, and control code data for initiating or terminating a discard operation of each layered data are added to each layered data partitioned by said predetermined size to create layered packet data, followed by UDP packetization and IP packetization;

reconstructing UDP packet data and said layered packet data from the IP packet data flow received, and discarding data from which UT)P data is not reconstructible;

checking for continuity in the sequence numbers of said reconstructed layered packet data by each flow identifier data; and when the sequence numbers are discontinuous, and if said control code data is control code data for initiating the discard operation, discarding subsequently-received layered packet data up to the one immediately preceding the layered packet data including the next control code data, and if said control code data is control code data for terminating the discard operation, discarding subsequently-received layered packet data up to the one including the next control code data, applying UDP packetization and IP packetization to following layered packet data, and distributing the resultant to the same destination as that at reception, wherein the discard is initiated at an initial data packet of the meaningful frame or slice of audiovisual data rather than at a middle data packet of the meaningful frame or slice of audiovisual data.

14. A data shaping apparatus comprising:

means for receiving a data flow of a plurality of sets of the packet data transmitted via respective data packets, said data packets being converted from a meaningful frame or slice of audiovisual data, said data flow being created in such a manner that flow identifier data for identifying each layered data in layered data consisting of a plurality of streams, a sequence number to be consecutively given to data partitioned by predetermined size, and control code data for initiating or terminating a discard operation of each layered data are added to each layered data partitioned by said predetermined size to create layered packet data, followed by UDP packetization and IP packetization;

means for reconstructing UDP packet data and layered packet data from the IP packet data received;

means for discarding data if UDP data is not reconstructible from the data;

means for checking for continuity in the sequence numbers of said reconstructed layered packet data by each flow identifier data;

means for discarding, if said control code data is control code data for initiating the discard operation, subsequently-received layered packet data up to the one immediately preceding the layered packet data including the next control code data, as well as discarding, if said control code data is control code data for terminating the discard operation, subsequently-received layered packet data up to the one including the next control code data, applying UDP packetization and IP packetization to following layered packet data, and distributing the resultant to the same destination as that at the time of reception, in the cases where the sequence numbers are discontinuous; and means for applying, in the cases where the sequence numbers are continuous, UDP packetization and IP packetization to all layered packet data received and distributing the resultant to the same destination as that at reception, wherein the discard is initiated at an initial data packet of the meaningful frame or slice of audiovisual data rather than at a middle data packet of the meaningful frame or slice of audiovisual data.

15. A decoding scheme comprising the steps of:

receiving an IP packet data flow of a plurality of sets of the packet data transmitted via respective data packets, said data packets being converted from a meaningful frame or slice of audiovisual data, said IP packet data flow being distributed after created in such a manner that flow identifier data for identifying each layered program data in layered audiovisual program data consisting of a plurality of audiovisual streams, a sequence number to be consecutively given to data partitioned by predetermined size, and control code data for initiating or terminating a discard operation of each layered data are added to each layered data partitioned by said predetermined size to create layered packet data, followed by UDP packetization and IP packetization;

reconstructing UDP packet data and said layered packet data from the IP packet data flow received;

discarding data if UDP data is not reconstructible from the data;

checking for continuity in the sequence numbers of said reconstructed layered packet data by each flow identifier data; and when the sequence numbers are discontinuous, and if said control code data is control code data for initiating the discard operation, discarding subsequently-received layered packet data up to the one immediately preceding the layered packet data including the next control code data, and if said control code data is control code data for terminating the discard operation, discarding subsequently-received layered packet data up to the one including the next control code data and decoding following layered packet data, wherein the discard is initiated at an initial data packet of the meaningful frame or slice of audiovisual data rather than at a middle data packet of the meaningful frame or slice of audiovisual data.

16. A data decoding and displaying apparatus comprising:

means for receiving an IP packet data flow of a plurality of sets of the packet data transmitted via respective data packets, said data packets being converted from a meaningful frame or slice of audiovisual data, said IP packet data flow being distributed after created in such a manner that flow identifier data for identifying each layered program data in layered audiovisual program data consisting of a plurality of audiovisual streams, a sequence number to be consecutively given to data partitioned by predetermined size, and control code data for initiating or terminating a discard operation of each layered data are added to each layered data partitioned by said predetermined size to create layered packet data, followed by UDP packetization and IP packetization;

means for reconstructing UDP packet data and layered packet data from the IP packet data received;

means for discarding data if UDP data is not reconstructible from the data;

means for checking for continuity in the sequence numbers of said reconstructed layered packet data by each flow identifier data;

means for discarding, if said control code data is control code data for initiating the discard operation, subsequently-received layered packet data up to the one immediately preceding the layered packet data including the next control code data, and if said control code data is control code data for terminating the discard operation, discarding subsequently-received layered packet data up to the one including the next control code data and decoding following layered packet data, in the cases where the sequence numbers are discontinuous;

means for decoding, in the cases where the sequence numbers are continuous, all the layered packet data received; and means for displaying the decoded data, wherein the discard is initiated at an initial data packet of the meaningful frame or slice of audiovisual data rather than at a middle data packet of the meaningful frame or slice of audiovisual data.

17. A packet data duplicating and distributing method comprising the steps of:

retaining flow identifier data for identifying data to be duplicated and control code data for controlling the duplication processing for each of a plurality of sets of packet data transmitted via respective data packets converted from a meaningful frame or slice of audiovisual data; and when packet data provided with said flow identifier data and said control code data is received, and the packet data identified is to be duplicated, performing duplication initiation and duplication termination on the packet data having said retained flow identifier data based on said control code data, wherein the duplication is initiated at an initial data packet of the meaningful frame or slice of audiovisual data rather than at a middle data packet of the meaningful frame or slice of audiovisual data.

18. A packet data duplicating and distributing apparatus comprising:

means for retaining flow identifier data for identifying data to be duplicated and control code data for controlling the duplication processing for each of a plurality of sets of packet data transmitted via respective data packets converted from a meaningful frame or slice of audiovisual data;

means for receiving packet data provided with said flow identifier data and control code data; and means for performing, when the packet data is to be duplicated is received, duplication initiation and duplication termination on the packet data having said retained flow identifier data based on said control code data, wherein the duplication is initiated at an initial data packet of the meaningful frame or slice of audiovisual data rather than at a middle data packet of the meaningful frame or slice of audiovisual data.

* * * * *